(12) United States Patent
Ohno et al.

(10) Patent No.: US 11,758,278 B2
(45) Date of Patent: Sep. 12, 2023

(54) OPTICAL APPARATUS

(71) Applicant: KABUSHIKI KAISHA TOSHIBA, Tokyo (JP)

(72) Inventors: Hiroshi Ohno, Tokyo (JP); Hideaki Okano, Yokohama Kanagawa (JP); Hiroya Kano, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/249,357

(22) Filed: Feb. 26, 2021

(65) Prior Publication Data
US 2022/0086326 A1   Mar. 17, 2022

(30) Foreign Application Priority Data

Sep. 17, 2020   (JP) .................................. 2020-156162

(51) Int. Cl.
| | |
|---|---|
| *H04N 23/74* | (2023.01) |
| *G03B 5/02* | (2021.01) |
| *H04N 9/01* | (2023.01) |
| *H04N 23/71* | (2023.01) |

(52) U.S. Cl.
CPC ............ *H04N 23/74* (2023.01); *G03B 5/02* (2013.01); *H04N 9/01* (2023.01); *H04N 23/71* (2023.01); *G03B 2205/0046* (2013.01)

(58) Field of Classification Search
CPC .... H04N 5/2354; H04N 5/2351; H04N 9/077; H04N 23/74; H04N 9/01; H04N 23/71; G03B 5/02; G03B 2205/0046; G01B 11/24; G01B 11/26; G01B 11/0608; G01B 2210/50

See application file for complete search history.

(56) References Cited

U.S. PATENT DOCUMENTS

| | | | |
|---|---|---|---|
| 5,675,407 A | 10/1997 | Geng | |
| 10,732,102 B2 * | 8/2020 | Ohno | .................. G01N 21/455 |
| 2017/0282297 A1 | 10/2017 | Ohno | |
| 2019/0219501 A1 * | 7/2019 | Ohno | .................. G01N 21/455 |

FOREIGN PATENT DOCUMENTS

| | | |
|---|---|---|
| JP | S63-26512 A | 2/1988 |
| JP | 5969562 B2 | 8/2016 |

* cited by examiner

*Primary Examiner* — Twyler L Haskins
*Assistant Examiner* — Angel L Garces-Rivera
(74) *Attorney, Agent, or Firm* — Finnegan, Henderson, Farabow, Garrett & Dunner, LLP

(57) ABSTRACT

According to an embodiment, an optical apparatus includes a lighting unit, an imaging unit, and a processor. The lighting unit emits illumination rays. The imaging unit includes: a wavelength selecting unit including first and second wavelength selection regions; and a sensor. The first wavelength selection region converts a first ray passing through the first wavelength selection region into a first selected ray. The second wavelength selection region converts a second ray passing through the second wavelength selection region into a second selected ray. The sensor can acquire color phase information indicating color phases of the first selected ray and the second selected ray. The processor estimates a ray direction of the first ray and a ray direction of the second ray based on the color phase information and a relative position of the wavelength selecting unit in the imaging unit.

12 Claims, 19 Drawing Sheets

OPTICAL APPARATUS

CROSS-REFERENCE TO RELATED APPLICATIONS

This application is based upon and claims the benefit of priority from Japanese Patent Application No. 2020-156162, filed on Sep. 17, 2020; the entire contents of which are incorporated herein by reference.

FIELD

Embodiments described herein relate generally to an optical apparatus.

BACKGROUND

In various industries, measuring a shape of an object in a contactless manner becomes important. There is a conventional method of dispersing light to illuminate an object, acquiring dispersed images by an imaging element, and estimating ray directions to acquire information on a surface of the object.

There is provided an optical apparatus that can acquire information on a surface of an object without dispersing light at a lighting side.

DETAILED DESCRIPTION

Figure 1:
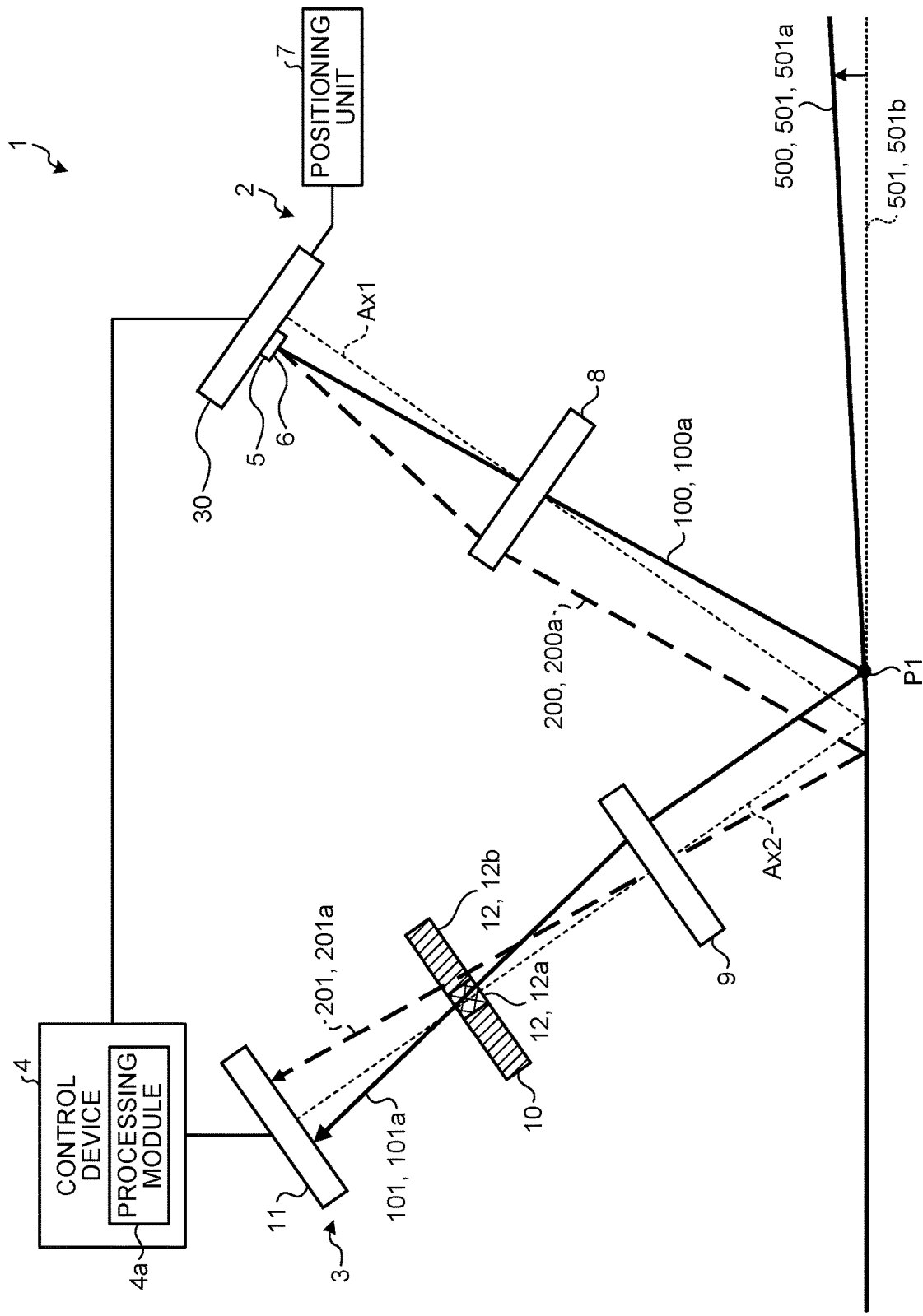
FIG. 1 is a diagram schematically illustrating a schematic configuration of an optical apparatus according to a first embodiment.

According to an embodiment, an optical apparatus includes a lighting unit, an imaging unit, and a processor. The lighting unit emits illumination rays. The imaging unit includes a wavelength selecting unit including a plurality of wavelength selection regions through which the illumination rays reflected by a surface of an object or the illumination rays transmitted through the surface pass and a sensor configured to receive the illumination rays passing through the wavelength selecting unit. The plurality of wavelength selection regions includes a first wavelength selection region and a second wavelength selection region. The first wavelength selection region converts a first ray passing through the first wavelength selection region among the illumination rays into a first selected ray whose dominant wavelength is a first wavelength. The second wavelength selection region converts a second ray passing through the second wavelength selection region among the illumination rays into a second selected ray whose dominant wavelength is a second wavelength different from the first wavelength. The sensor is able to acquire color phase information indicating color phases of the first selected ray and the second selected ray. The processor is configured to estimate a ray direction of the first ray and a ray direction of the second ray based on the color phase information and a relative position of the wavelength selecting unit in the imaging unit.

Exemplary embodiments of the present disclosure will be described below with reference to the accompanying drawings. The drawings are schematic or conceptual, and a relationship between the thickness and width of each part, a ratio of size between parts, and the like are not necessarily the same as a real thing. Even if the same part is illustrated in the drawings, the dimension and ratio may be represented with different values depending on the drawings. In the present specification and drawings, the same components as the previously described components in the previously illustrated diagram have the same reference numbers, and detailed description for them will be omitted as appropriate.

First Embodiment

Figure 2:
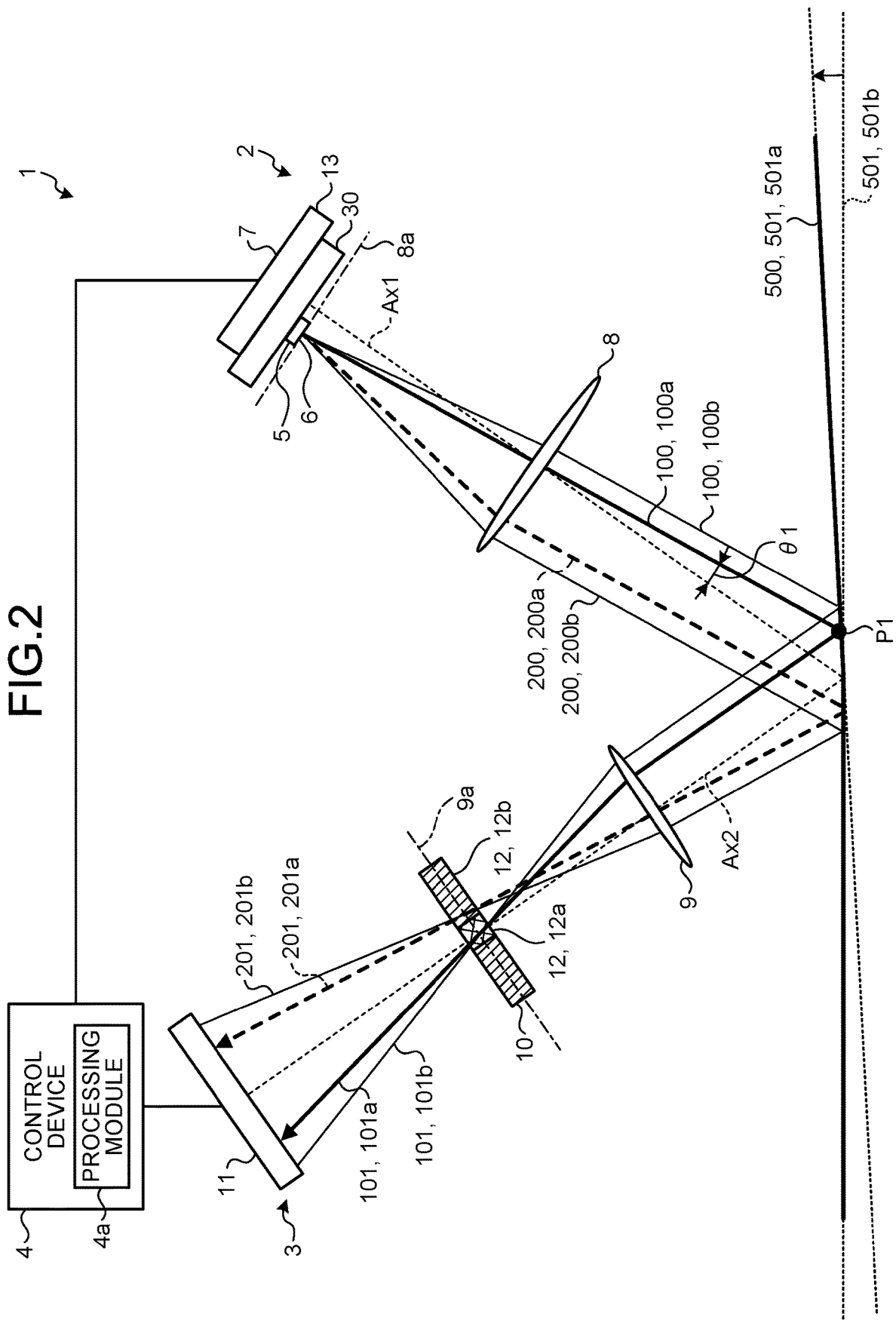
FIG. 2 is a diagram schematically illustrating a detailed configuration and ray paths of the optical apparatus according to the first embodiment.

Hereinafter, an optical apparatus 1 according to the present embodiment will be described in detail with reference to FIGS. 1 to 3. FIG. 1 is a diagram schematically illustrating a schematic configuration of the optical apparatus 1 according to the present embodiment. FIG. 2 is a diagram schematically illustrating a detailed configuration and ray paths of the optical apparatus 1 according to the present embodiment. FIGS. 1 and 2 are illustrated by a cross section in which a ray passes through an object point P1 (point for which an image is formed on a sensor 11 of an imaging unit 3) on a surface 501 of an object 500.

The optical apparatus 1 of the present embodiment illustrated in FIG. 1 is an optical inspection device that inspects (measures) the surface 501 of the object 500. The optical apparatus 1 includes a lighting unit 2, the imaging unit 3, and a control device 4.

The lighting unit 2 includes a light source 5, a ray emitting surface 6, a positioning unit 7, and an imaging optical element 8. The imaging optical element 8 is an example of a second imaging optical element.

The light source 5 is fixed to a board 30. Light generated by the light source 5 is emitted from the ray emitting surface 6. For example, a ray 100 is emitted toward the surface 501 of the object 500 from the ray emitting surface 6. Herein, light is defined as an electromagnetic wave. In other words, light may be visible light, X-rays, infrared rays, near-infrared rays, far-infrared rays, or a microwave. Moreover, light may be any of coherent light (laser etc.) and incoherent light (LED etc.). Herein, the wavelength of visible light is 400 nm to 800 nm. The ray emitting surface 6 is an example of a light output part from which illumination rays are emitted.

The light source 5 of the lighting unit 2 emits at least two rays having wavelengths different from each other. For example, the light source 5 may be a light emitting diode (LED), an organic light emitting diode (OLED), a thermal-radiative filament, or a plasma-emittable light source. Alternatively, the light source 5 may be a light guiding luminous body by a combination of a light guiding plate and LED. Alternatively, the light source 5 may include a plurality of light emitting elements such as a liquid crystal panel and a micro LED array. In other words, any one emitting light may be the light source.

Herein, the light source 5 is an LED that emit white light. The white light has significant intensity in a wavelength region of a wavelength spectrum from 450 nm to 650 nm. In other words, the white light has at least two wavelengths different from each other.

The imaging optical element 8 representatively includes a lens, a GRIN lens, a concave mirror, or the like. The imaging optical element 8 moves the object point P1 to a conjugate image point. Herein, the imaging optical element 8 moves a ray group (diverging light) emitted from a micro region substantially regarded as a point to a ray group (condensed light) substantially regarded as a point. Any one having such an action may be the imaging optical element 8. Herein, as an example, as illustrated in FIG. 2, the imaging optical element 8 is a convex lens. The imaging optical element 8 is also referred to as a first lens or a second lens. Moreover, an optical axis Ax1 of the imaging optical element 8 is referred to as a first optical axis or a second optical axis.

The positioning unit 7 of the lighting unit 2 can spatially move the ray emitting surface 6. For example, the light source 5 may be arranged and moved on a mechanical movable mechanism such as a linear stage with a microm-eter. Such a mechanical movable mechanism may be electrically controlled or may be manually moved. Alternatively, a role of the positioning unit 7 may be fulfilled by arranging a plurality of light emitting elements as the light source 5 and turning on or off each of the light emitting elements to move the ray emitting surface 6 by electrical ON/OFF. This method has an advantage of a high-speed movement compared to a mechanical movable mechanism.

In the present embodiment, as an example, as illustrated in FIG. 2, the positioning unit 7 includes a movable part 13. The movable part 13 is configured by a linear stage with a micrometer. The light source 5 is arranged above the movable part 13. As a result, the position of the light source 5 can be determined with high precision by adjusting the micrometer.

As illustrated in FIG. 1, the imaging unit 3 includes an imaging optical element 9, a wavelength selecting unit 10, and a sensor 11.

The imaging unit 3 captures an image of rays 100 and 200 reflected by the surface 501 or transmitted through the surface 501 of the object 500. In the present embodiment, the surface 501 of the object 500 reflects the rays 100 and 200, but the embodiment is not limited to this. The surface 501 may transmit the rays 100 and 200. The imaging unit 3 forms an image of the rays 100 and 200 by the imaging optical element 9 to acquire the captured image. When the object 500 transmits light, a surface for which an image is formed on the sensor 11 by the imaging unit 3 is regarded as the surface 501 of the object 500. At this time, the surface 501 of the object 500 is assumed to be on the front or back surface of the object 500 or inside of the object. The imaging optical element 9 is an example of a first imaging optical element.

Herein, the imaging optical element 9 is a convex lens. Note that any one moving the object point P1 of a lens, a concave mirror, etc. to a conjugate image point may be the imaging optical element 9. The imaging optical element 9 is also referred to as a first lens or a second lens. An optical axis Ax2 of the imaging optical element 9 is referred to as a first optical axis or a second optical axis.

The wavelength selecting unit 10 includes at least two, namely, a plurality of wavelength selection regions 12 (region). In the present embodiment, the plurality of wavelength selection regions 12 includes a first wavelength selection region 12a and a second wavelength selection region 12b. Each of the wavelength selection regions 12 is a transmissive or reflective wavelength filter. In other words, each of the wavelength selection regions 12 selectively transmits or reflects the ray 100 or 200 incident to the corresponding wavelength selection region 12 depending on its wavelength spectrum. Herein, the wavelength selection regions 12 are a transmissive wavelength filter, and transmissive wavelength spectra of the first wavelength selection region 12a and the second wavelength selection region 12b are different from each other. Herein, a ray incident to and transmitted through the first wavelength selection region 12a is referred to as a selected ray 101. The selected ray 101 includes a plurality of rays. The plurality of selected rays 101 includes selected rays 101a and 101b. Note that the embodiment is not limited to this. The selected ray 101 may be one ray.

The sensor 11 includes at least one pixel and receives light at each pixel to obtain a light intensity. A value obtained by digitalizing the light intensity is called a pixel value. Moreover, each pixel has at least two color phase channels, and a pixel value is assigned to each color phase channel. In other words, at each pixel, a pixel value is assigned to each color phase channel in accordance with a wavelength spectrum of light. Herein, a pixel value for a color phase channel is called a color phase pixel value. For example, if blue light having a peak at a wavelength 450 nm is received, the pixel value of the color phase channel ch1(B) is increased, and the pixel values of the color phase channel ch2(G) and the color phase channel ch3(R) are not increased. If green light having a peak at a wavelength 550 nm is received, the pixel value of the color phase channel ch2(G) is increased and the pixel values of other channels are not increased. If red light having a peak at a wavelength 650 nm is received, the pixel value of the color phase channel ch3(R) is increased and the pixel values of other color phase channels are not increased. In other words, a wavelength spectrum of light can be estimated depending on color phase pixel values. A color phase pixel value is an example of color phase information. The sensor 11 can record pixels by discriminating at least the ray of a first wavelength from the ray of a second wavelength different from the first wavelength as color phases different from each other.

The sensor 11 may be a line sensor in which pixels are arranged with a shape close to a line, or may be an area sensor in which pixels are arranged with a shape close to a rectangle or a square. However, the embodiment is not limited to these. The shape of the sensor 11 may be any shape of a polygon, a circle, etc. In the present embodiment, the sensor 11 is an area sensor.

The control device 4 can perform the control and arithmetic of each unit of the optical apparatus 1. In the present embodiment, the control device 4 includes a Central Processing Unit (CPU), a Read Only Memory (ROM), and a Random Access Memory (RAM). In other words, the control device 4 is a computer. The CPU reads and executes a program stored in the ROM etc. Moreover, the CPU is configured to be able to execute various arithmetic processes in parallel. The RAM temporarily stores various types of data that are used when the CPU executes the program to execute various arithmetic processes. The control device 4 is also referred to as an arithmetic unit or an information processing unit.

The control device 4 includes at least a processing module 4a as a functional configuration. This functional configuration is realized by the CPU executing a program stored in the ROM etc. In addition, a part or the whole of the functional configuration may be realized by dedicated hardware (circuit).

The processing module 4a receives color phase pixel values from the sensor 11 and can execute arithmetic processing using the color phase pixel values.

As illustrated in FIG. 2, rays that are emitted from the lighting unit 2 include a ray 100a, a ray 100b, a ray 200a, and a ray 200b. A generic term of the ray 100a and the ray 100b is rays 100, and a generic term of the ray 200a and the ray 200b is rays 200. Both the rays 100 and the rays 200 are white light. Note that the rays are not limited to white light and thus may be any light having at least two different wavelengths.

The wavelength selecting unit 10 transmits a ray whose dominant wavelength (dominant component) is blue light having a wavelength of 450 nm through the first wavelength selection region 12a. On the other hand, the first wavelength selection region 12a blocks (does not transmit by absorption or reflection) red light having a wavelength of 650 nm. The second wavelength selection region 12b transmits a ray whose dominant wavelength (dominant component) is red light having a wavelength of 650 nm but blocks (does not transmit by absorption or reflection) blue light having a wavelength of 450 nm. Herein, for example, a wavelength of 450 nm is the first wavelength and a wavelength of 650 nm is the second wavelength.

In the wavelength selecting unit 10, the first wavelength selection region 12a is placed centrally, and the second wavelength selection region 12b is placed around it.

The surface 501 of the object 500 consists of two planes, which are a first plane 501a and a second plane 501b. The first plane 501a is inclined with respect to the second plane 501b. Herein, an inclining angle of the plane is set by using the second plane 501b as a reference plane. In general, the inclining angle of the plane can be represented by two variables. Herein, the first plane 501a is assumed to be only uniaxially inclined, and the inclining angle can be represented by one variable. Moreover, in the present embodiment, for simplicity of explanation, the surface 501 of the object 500 is assumed to be a mirror surface. In this regard, however, the surface is not limited to this. The surface 501 of the object 500 may be a scattering surface. When the surface 501 of the object 500 is a mirror surface, reflected light has only a regular reflection light component and substantially does not have a scattered light component.

The rays 100 (rays 100a and 100b) are reflected at a point (object point P1) on the first plane 501a, are incident to and refracted by the imaging optical element 9, and reach the first wavelength selection region 12a. Furthermore, the selected rays 101 (selected rays 101a and 101b) passing through the first wavelength selection region 12a reach the sensor 11. Herein, the imaging optical element 9 forms an image of the object point P1 (reflected point) on the sensor 11. The selected rays 101 (selected rays 101a and 101b) have the first wavelength as the dominant wavelength (dominant component).

The rays 200 (rays 200a and 200b) are reflected at a point on the second plane 501b, are incident to and refracted by the imaging optical element 9, and reach the second wavelength selection region 12b. Furthermore, the selected rays 201 (selected rays 201a and 201b) passing through the second wavelength selection region 12b reach the sensor 11. Herein, the imaging optical element 9 forms an image of an object point (reflected point) for the rays 200 (rays 200a and 200b) on the sensor 11. The selected rays 201 (selected rays 201a and 201b) have the second wavelength as the dominant wavelength (dominant component).

In the present embodiment, the ray emitting surface 6 is arranged on a focal plane 8a (FIG. 2) of the imaging optical element 8 or near the focal plane 8a. As a result, ray groups emitted from the ray emitting surface 6 substantially become parallel rays by the imaging optical element 8. In other words, the rays 100 (rays 100a and 100b) and the rays 200 (rays 200a and 200b) are substantially parallel to each other. These ray groups (groups including the rays 100a and 100b and the rays 200a and 200b) parallel to each other are called parallel illumination. An angle $\theta 1$ that is an inclining angle of parallel illumination with respect to the optical axis Ax1 can be adjusted by the positioning unit 7 of the ray emitting surface 6. The angle $\theta 1$ is also referred to as a first angle.

The wavelength selecting unit 10 is arranged on a focal plane 9a (FIG. 2) of the imaging optical element 9 or near the focal plane 9a. As a result, when parallel illumination (ray groups parallel to each other) is directly incident to the imaging optical element 9, the ray groups are once concentrated at the wavelength selecting unit 10. Furthermore, rays transmitted through (or reflected by) the wavelength selecting unit 10 reach the sensor 11 as selected rays. In the present embodiment, parallel rays incident along the optical axis Ax2 are once concentrated at the first wavelength selection region 12a of the wavelength selecting unit 10. On the other hand, parallel rays inclined against the optical axis Ax2 are once concentrated at the second wavelength selection region 12b of the wavelength selecting unit 10.

The rays 100 (rays 100a and 100b) and the optical axis Ax2 have a directly-facing relationship with respect to the first plane 501a. Herein, when the first plane 501a is a mirror surface, a directly-facing relationship means that the rays 100 (rays 100a and 100b) are reflected by the first plane 501a and their reflection directions are along the optical axis Ax2. In other words, this means that an incidence angle and a reflection angle of the rays 100 (rays 100a and 100b) with respect to a normal direction of the first plane 501a become equal when the first plane 501a is a mirror surface. Such the reflection is referred to as regular reflection. In this regard, however, when a plane is not a mirror surface but a diffusing surface such as a rough surface, light is scattered. In this case, the direction of a dominant component of reflected light may not necessarily have a relationship of regular reflection with respect to an incident direction. A dominant component of reflected light is called a specular component, and its direction is called a specular direction. Other components are called a scattering component. Hereinafter, when a plane is a mirror surface, regular reflection light is also called a specular component.

In the present specification, even when a plane is any of a mirror surface and a diffusing surface, that two lines of rays or axes have a directly-facing relationship with respect to a certain plane means, when a ray incident along one line is reflected by this plane, a specular direction of the reflected light is along another line. A case where light is transmitted through the object 500 is also similar. When a ray is incident along a certain line and is transmitted through the object 500, that the direction of a dominant component of the transmitted light is along another line defines that two lines have a directly-facing relationship with respect to this plane.

The rays 100 (rays 100a and 100b) are reflected by the first plane 501a along the optical axis Ax2. This is because the rays 100 (rays 100a and 100b) and the optical axis Ax2 have a directly-facing relationship with respect to the first plane 501a. The rays 100 (rays 100a and 100b) further pass through the first wavelength selection region 12a of the wavelength selecting unit 10 by the imaging optical element 9, become the selected rays 101 (rays 101a and 101b), and their images are formed on the sensor 11.

Next, an operation of the optical apparatus 1 according to the present embodiment will be described. In FIG. 2, the ray 100a and the ray 100b are parallel rays, and are reflected by the first plane 501a. Both the rays 100a and 100b are reflected along the optical axis Ax2. This is because the rays 100a and 100b and the optical axis Ax2 have a directly-facing relationship and both the rays 100a and 100b are parallel. Such the directly-facing relationship can be taken with respect to an arbitrary plane by moving the ray emitting surface 6 by the positioning unit 7. The ray 100a and the ray 100b are further refracted by and transmitted through the imaging optical element 9 and are incident to the first wavelength selection region 12a. In other words, a ray reflected by the first plane 501a or a plane whose inclining angle is equal to that of the first plane 501a is incident to the first wavelength selection region 12a. In other words, arbitrary two rays parallel to the ray 100a are incident to the first wavelength selection region 12a if they are reflected by a plane having the same inclining angle as that of the first plane 501a. The ray 100a and the ray 100b further become the respective selected rays 101a and the selected rays 101b and their images are formed on the sensor 11. Moreover, because both the rays 100a and 100b are incident to the first wavelength selection region 12a, the selected rays 101a and 101b have the first wavelength as the dominant wavelength (dominant component).

The ray 200a and the ray 200b are parallel to each other, and are reflected by the second plane 501b. Both the rays 200a and 200b are reflected to a direction inclined from the optical axis Ax2. This is because the rays 200a and 200b and the optical axis Ax2 do not have a directly-facing relationship and both the rays 200a and 200b are parallel. A positional relationship that deviates from such a directly-facing relationship with respect to an arbitrary plane can be taken by moving the ray emitting surface 6 by the positioning unit 7. The ray 200a and the ray 200b are further refracted by and transmitted through the imaging optical element 9 and are incident to the second wavelength selection region 12b. In other words, a ray reflected by a plane whose inclining angle is equal to that of the second plane 501b is incident to the second wavelength selection region 12b. In other words, arbitrary two rays parallel to the ray 200a are incident to the second wavelength selection region 12b if they are reflected by a plane whose inclining angle is the same as that of the second plane 501b. The ray 200a and the ray 200b further become the respective selected rays 201a and 201b and their images are formed on the sensor 11. Moreover, because both the rays 200a and 200b pass through the second wavelength selection region 12b, the selected rays 201a and 201b have the second wavelength as the dominant wavelength (dominant component).

As described above, all rays reflected by a plane having the same inclining angle as that of the first plane 501a are incident to the first wavelength selection region 12a to become the selected rays having the first wavelength, and their images are formed on the sensor 11. On the other hand, all rays reflected by a plane having the same inclining angle as that of the second plane 501b are incident to the second wavelength selection region 12b to become the selected rays having the second wavelength, and their images are formed on the sensor 11. The pixels of the sensor 11 are assigned to different color phase channels by discriminating the first wavelength from the second wavelength. In other words, the rays 100 (rays 100a and 100b) and the rays 200 (rays 200a and 200b) can be identified by color phase pixel values. Consequently, this means that the ray directions of reflected light can be identified by color phase pixel values. It may be said that inclinations of the surface 501 of the object 500 can be measured because the ray directions of the reflected light are determined by the inclinations of the surface 501 of the object 500. The inclinations of the surface 501 of the object 500 are important information on the shape of the object 500. In other words, it may be said that the shape of the object 500 can be presumed by the present embodiment. Moreover, if there is information on a positional relationship between the imaging unit 3 and the lighting unit 2, the distance up to the object 500 can be calculated from the principle of triangulation. In other words, the shape of the object can be calculated. In the present embodiment, by the above method, the processing module 4a can estimate the ray directions of the rays 100 and the ray directions of the rays 200 based on color phase pixel values that are color phase information and can adjust an inclining angle (angle θ1) of parallel illumination with respect to the optical axis Ax1 by the positioning unit 7 of the ray emitting surface 6. As a result, it is possible to change a correspondence relationship between the ray directions of the reflected light and the wavelength selection regions 12a and 12b of the wavelength selecting unit 10.

Next, the flow of processing that is executed by the processing module 4a will be described with reference to FIG. 3. FIG. 3 is a flowchart illustrating processing that is executed by the processing module 4a of the optical apparatus 1 according to the present embodiment.

First, before the processing module 4a executes processing, the control device 4 determines the position of the ray emitting surface 6 by using the positioning unit 7 of the lighting unit 2. Then, the control device 4 determines the directions of the illumination rays by relative position information of the ray emitting surface 6 in the lighting unit 2, which is determined by the positioning unit 7 of the lighting unit 2. Furthermore, based on relative position information of the wavelength selecting unit 10 in the imaging unit 3, the control device determines a relationship between the directions of the rays reflected by the surface 501 of the object 500 and the wavelength selection regions 12. The selected rays passing through (transmitted through or reflected by) the wavelength selection regions 12 of the wavelength selecting unit 10 are identified by color phase pixel values. For that reason, a relationship between color phase pixel values and ray directions is determined.

Figure 3:
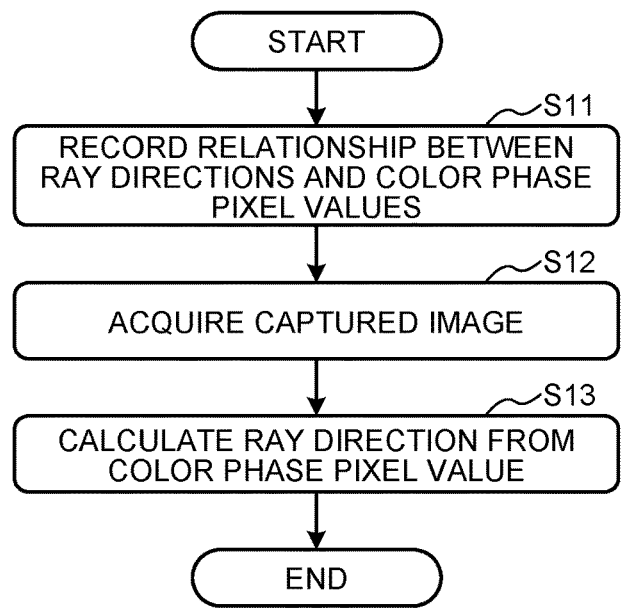
FIG. 3 is a flowchart illustrating processing that is executed by a processing module of the optical apparatus according to the first embodiment.

Then, as illustrated in FIG. 3, the processing module 4a records the relationship between the color phase pixel values and ray directions (Step S11). Then, the processing module 4a acquires a captured image from the sensor 11 (Step S12) and acquires a color phase pixel value of each pixel. The processing module 4a calculates the ray directions of rays by the above method from the color phase pixel values by using the previously recorded relationship between the color phase pixel values and ray directions (Step S13).

When calculating the ray directions from the color phase pixel values, arithmetic processing of removing influence of color distribution, reflectance distribution, etc. of the surface 501 of the object 500 to reduce noise may be performed.

For example, an image when the wavelength selecting unit 10 is detached is previously acquired, and then an image when the wavelength selecting unit 10 is inserted is acquired. Then, calculating a difference between them results in an effect of reducing the influence of color distribution and reflectance distribution of the surface 501 of the object 500. Alternatively, a threshold may be set for a pixel value of each color phase of the color phase pixel values to offset it. As a result, an effect of reducing background noise is obtained.

As described above, the optical apparatus 1 according to the present embodiment includes the lighting unit 2, the imaging unit 3, and the processing module 4a. The lighting unit 2 emits illumination rays. The imaging unit 3 includes the wavelength selecting unit 10 and the sensor 11. The wavelength selecting unit includes the plurality of wavelength selection regions 12 (the first wavelength selection region 12a and the second wavelength selection region 12b) through which the illumination rays reflected by the surface 501 of the object 500 or the illumination rays transmitted through the surface 501 pass. The sensor 11 receives the illumination rays passing through the wavelength selecting unit 10. The first wavelength selection region 12a converts the rays 100 passing through the first wavelength selection region 12a among the illumination rays into the selected rays 101 having the first wavelength as a dominant wavelength. The second wavelength selection region 12b converts the rays 200 passing through the second wavelength selection region 12b among the illumination rays into the selected rays 201 having the second wavelength different from the first wavelength as a dominant wavelength. The sensor 11 can acquire color phase information indicative of color phases of the selected rays 101 and the selected rays 201. The processing module 4a estimates the ray directions of the rays 100 and the ray directions of the rays 200 based on the color phase information and the relative position of the wavelength selecting unit 10 in the imaging unit 3.

According to such a configuration, it is possible to acquire information on the surface 501 of the object 500 without dispersing light near the lighting unit 2.

The present embodiment can obtain the effects of being able to inspect, for each pixel of the captured image, whether the surface 501 of the object 500 has the same inclining angle as that of the first plane 501a by using the corresponding color phase pixel value. Moreover, the present embodiment can obtain the effects of being able to identify whether the inclination of the surface 501 of the object 500 is close to that of the first plane 501a or the second plane 501b.

In the present embodiment, the optical apparatus 1 includes the positioning unit 7 provided in at least one (e.g., the imaging unit 3) of the lighting unit 2 and the imaging unit 3. The imaging unit 3 includes the imaging optical element 9 through which the illumination rays reflected by the surface 501 or the illumination rays transmitted through the surface 501 pass. The illumination rays passing through the imaging optical element 9 are incident to the wavelength selecting unit 10. The positioning unit 7 determines a directly-facing relationship between the illumination rays and the optical axis Ax2 of the imaging optical element 9.

According to such a configuration, the ray emitting surface 6 is moved by the positioning unit 7, the angle θ of parallel illumination is changed, and thus reflected light from the second plane 501b can be adjusted to be incident to the first wavelength selection region 12a. By doing so, for each pixel of one piece of the captured image, there are obtained the effects of being able to inspect whether the surface 501 of the object 500 has the same inclining angle as that of the second plane 501b by using the corresponding color phase pixel value. Then, there are obtained the effects of being able to identify whether the inclination of the surface 501 of the object 500 is close to that of the second plane 501b or the first plane 501a. The effects of spreading the range of applicable inspection are obtained by the positioning unit 7.

The ray emitting surface 6 is moved by the positioning unit 7, the angle θ of parallel illumination is changed, and thus identification by color phase pixel values may be performed with higher accuracy. For example, when the surface 501 of the object 500 is hard to reflect blue light but is easy to reflect red light, the color phase pixel value of the selected rays 101 that are blue rays passing through the first wavelength selection region 12a is small, and a difference from noise becomes small. In other words, an S/N ratio deteriorates. In that case, identification by color phase pixel values becomes difficult. Therefore, the ray emitting surface 6 is moved by the positioning unit 7, the angle θ of parallel illumination is changed, and thus reflected light from the second plane 501b is adjusted to be incident to the first wavelength selection region 12a. As a result, the selected rays 101 have the second wavelength of red light as a dominant wavelength (dominant component), and their color phase pixel values also become large. As a result, the effects of improving an S/N ratio and improving identification accuracy by color phase pixel values are obtained.

As described above, the present embodiment has the effects that a directly-facing relationship between the illumination rays and the imaging optical element 9 of the imaging unit 3 can be adjusted by the positioning unit 7 and the desired inclination of the surface 501 of the object 500 can be inspected. Moreover, the effects of improving the estimated accuracy on the shape of the surface 501 of the object 500 are also obtained.

In the present embodiment, the lighting unit 2 includes the ray emitting surface 6 from which illumination rays are emitted and the imaging optical element 8 that makes the illumination rays emitted from the ray emitting surface 6 parallel. According to such a configuration, it is possible to make the illumination rays parallel.

In the present embodiment, the lighting unit 2 includes the ray emitting surface 6 from which the illumination rays are emitted, the imaging optical element 8 that makes the illumination rays emitted from the ray emitting surface 6 parallel, and the positioning unit 7. The positioning unit 7 can incline the ray directions of the parallel rays with respect to the optical axis Ax1 of the imaging optical element 8. According to such a configuration, because the positioning unit 7 may not be provided in the imaging unit 3, a configuration of the imaging unit 3 can be simplified.

First Modification Example

Figure 4:
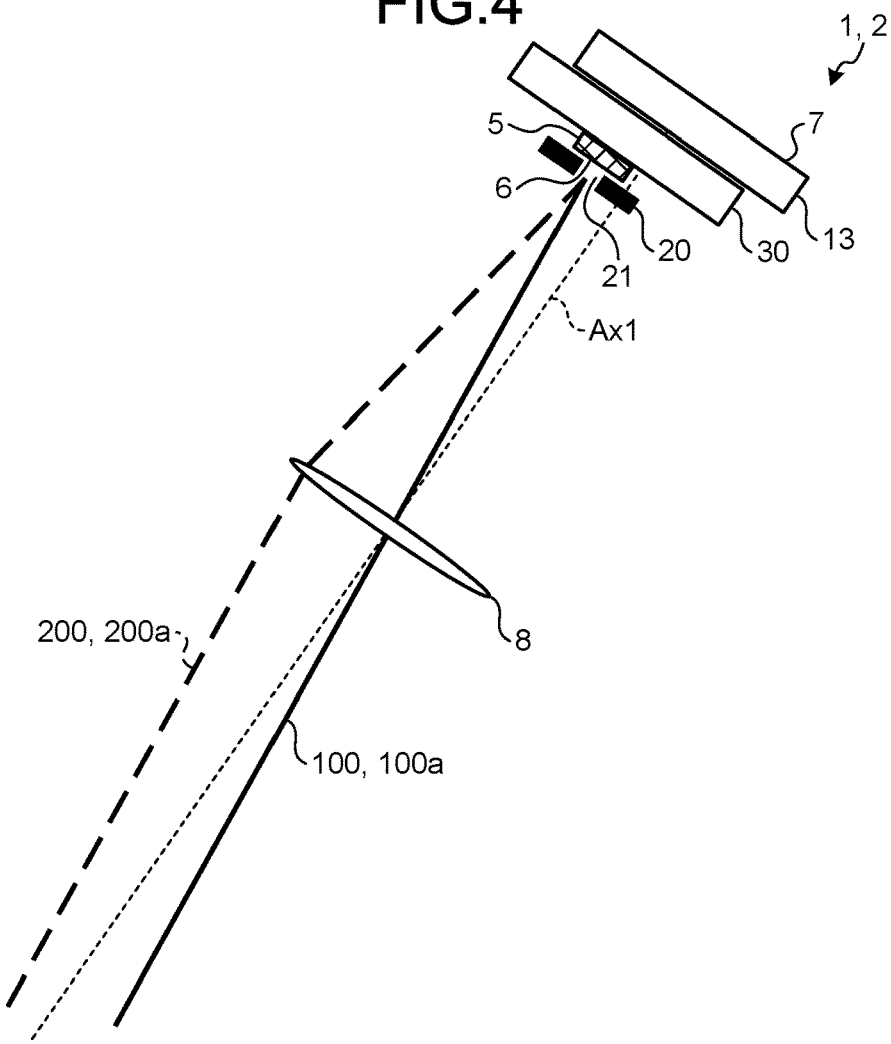
FIG. 4 is a diagram schematically illustrating a lighting unit according to a first modification example of the first embodiment.

FIG. 4 is a diagram schematically illustrating the lighting unit 2 according to the first modification example of the first embodiment. In the present modification example, a board member 20 as well as the light source 5 and the board 30 are arranged on the linear stage of the movable part 13. The board member 20 is provided with an opening 21. The opening 21 faces the ray emitting surface 6. The illumination rays emitted from the light source 5 reaches the imaging optical element 8 through the opening 21. In other words, the illumination rays are emitted from the opening 21 of the board member 20. The board member 20 is an example of a light output part.

The parallelism of parallel illumination can be adjusted by adjusting the size of the opening 21. There are the effects of improving the resolution accuracy of the inclination of the surface 501 of the object 500 by reducing the size of the opening 21 to increase parallelism. The directivity of light can be weakened by increasing the size of the opening 21 to weaken parallelism. As a result, there are obtained the effects of being able to prevent the sensor 11 from causing halation or exceeding the upper limit of pixel values by reflecting light having strong directivity by the surface 501 of the object 500.

Second Modification Example

Figure 5:
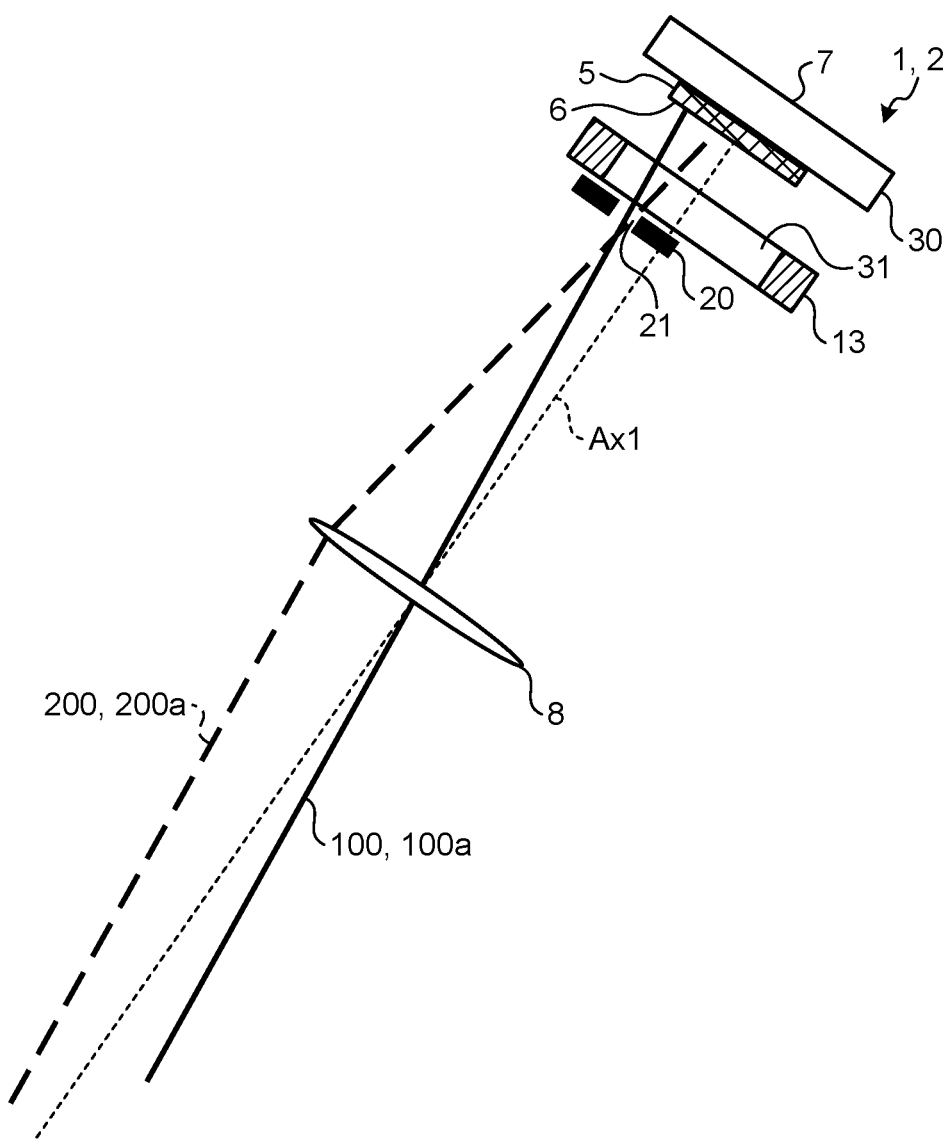
FIG. 5 is a diagram schematically illustrating the lighting unit according to a second modification example of the first embodiment.

FIG. 5 is a diagram schematically illustrating the lighting unit 2 according to the second modification example of the first embodiment. In the present modification example, the light source 5 and the board 30 are not fixed to the movable part 13. Moreover, the movable part 13 is provided with a through-hole 31. Moreover, the board member 20 described in the first modification example is arranged on or above the movable part 13. The opening 21 of the board member 20 communicates with the through-hole 31. The movable part 13 can move the board member 20. As a result, the opening 21 of the board member 20 can be moved. As a result, the parallel illumination emitted from the lighting unit 2 heads for the imaging optical element 8 through the through-hole 31 and the opening 21. According to such a configuration, the effects of being able to change the directions of the parallel illumination emitted from the lighting unit 2 are obtained.

Third Modification Example

Figure 6:
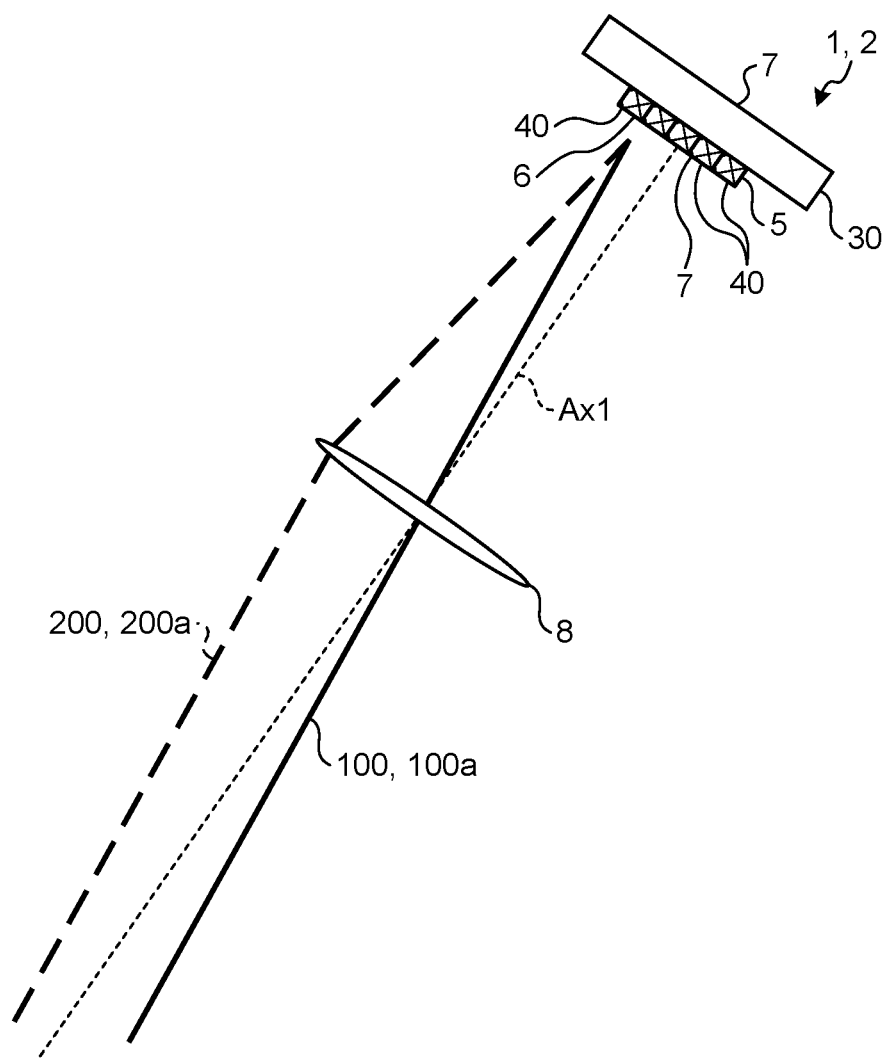
FIG. 6 is a diagram schematically illustrating the lighting unit according to a third modification example of the first embodiment.

FIG. 6 is a diagram schematically illustrating the lighting unit 2 according to the third modification example of the first embodiment. In the present modification example, the light source 5 includes a plurality of light emitting elements 40. Each of the light emitting elements 40 can control light emission by electrical ON/OFF. The wavelength spectra of the light emitting elements 40 may be previously different or may be electrically controlled. The wavelength spectra are fixedly the same and may not be controlled. The ray emitting surface 6 is formed by the turned-on light emitting element 40. In other words, the ray emitting surface 6 can be changed by ON/OFF of the light emitting elements 40. In the present embodiment, the positioning unit 7 is configured of the light source 5 and the board 30. Such a configuration has the effects of speeding up compared to a mechanical movement. Moreover, when the two light emitting elements 40 having different wavelength spectra are simultaneously turned on, there are the effects of being able to simultaneously irradiate the parallel illumination having two different directions and simultaneously identify them by the color phase pixel values.

Second Embodiment

Figure 7:
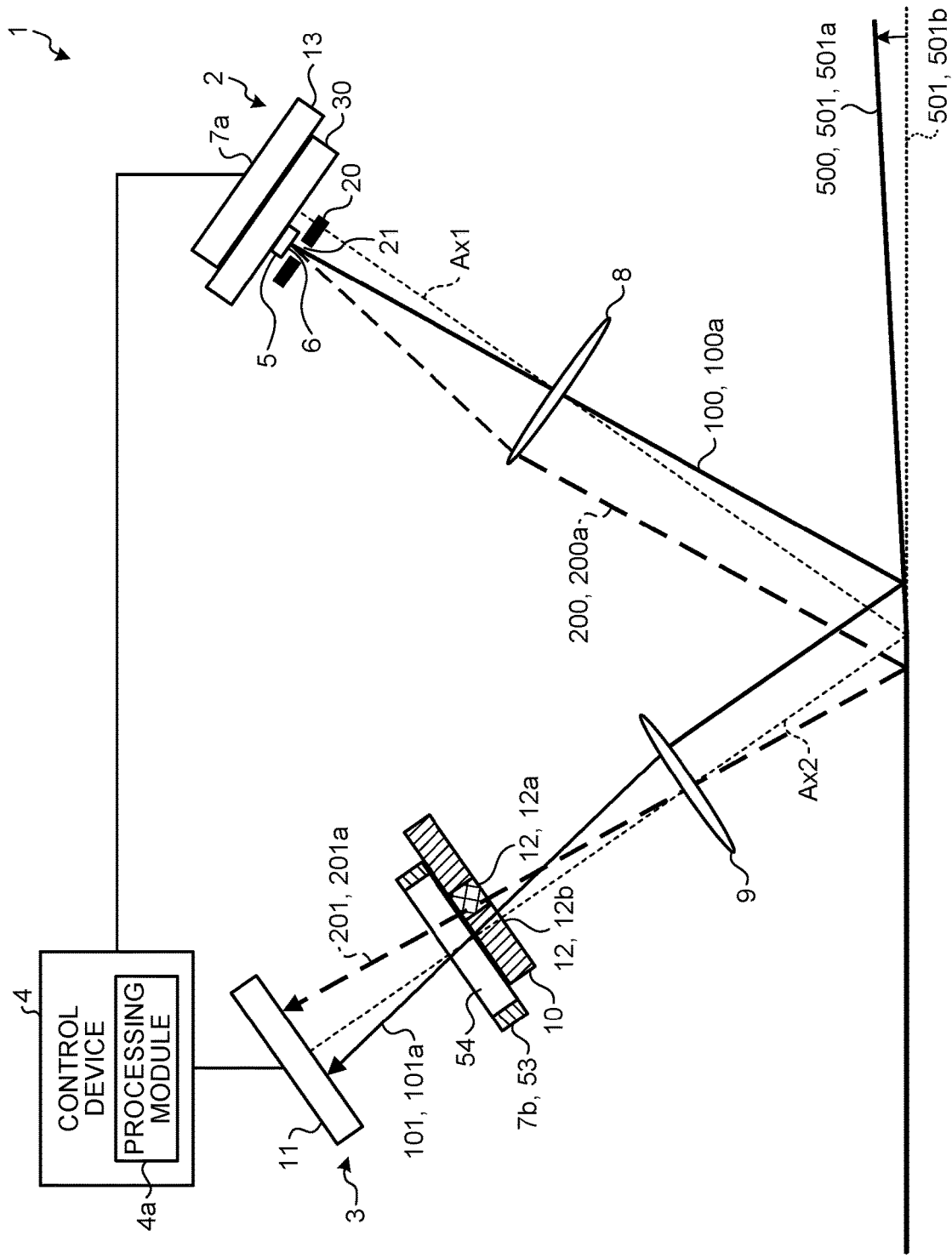
FIG. 7 is a diagram schematically illustrating an optical apparatus according to a second embodiment.

Hereinafter, the optical apparatus 1 according to the present embodiment will be described in detail with reference to FIG. 7. FIG. 7 is a diagram schematically illustrating the optical apparatus 1 according to the present embodiment.

The optical apparatus 1 according to the present embodiment includes the lighting unit 2, the imaging unit 3, and the control device 4. The configuration of the present embodiment is basically the same as the configuration of the first embodiment, and a difference between the first embodiment and the present embodiment will be mainly described herein.

The lighting unit 2 includes a first positioning unit 7a that changes the position of the opening 21 of the board member 20. The configuration of the first positioning unit 7a is similar to the positioning unit 7 according to the first modification example of the first embodiment. In other words, the first positioning unit 7a includes the movable part 13 and the board member 20 provided with the opening 21. The first positioning unit 7a changes a relative position between the opening 21 of the board member 20 and the light source. In this regard, however, the present embodiment is not limited to this, and the lighting unit 2 may not include the first positioning unit 7a.

The imaging unit 3 includes a second positioning unit 7b that changes the position of the wavelength selecting unit 10. In other words, the second positioning unit 7b determines the position of the wavelength selecting unit 10. The second positioning unit 7b includes a movable part 53. The movable part 53 is provided with an opening 54 (second opening). The movable part 53 may be a linear stage with a micrometer, for example. Moreover, the movement of the linear stage may be manually performed, or may be electrically performed by motor driving. The opening 54 is an example of the second opening.

The second positioning unit 7b and the wavelength selecting unit 10 may be integrated with each other. For example, the second positioning unit 7b and the wavelength selecting unit 10 may be configured by a liquid crystal micro display such as a spatial light modulator (SLM). The spatial light modulator may be reflection type or transmission type. For example, the spatial light modulator may be a reflective spatial light modulator such as a digital micromirror device (DMD). In other words, the wavelength selection regions 12 may be electrically controlled by using transmissive optical elements or reflective optical elements that are arranged in an array pattern. In this case, the wavelength selection regions 12 can be changed at high speed. In the present embodiment, to clarify the functional description, the second positioning unit 7b is assumed to be a linear stage with a micrometer.

As described above, the optical apparatus 1 according to the present embodiment includes two positioning units (the first positioning unit 7a and the second positioning unit 7b).

In other words, the optical apparatus includes at least one positioning unit. Note that the optical apparatus may include one of the positioning units.

Hereinafter, an operation of the present embodiment will be described.

The wavelength selection region 12 through which a ray reflected from the surface 501 of the object 500 passes can be changed by changing the position of the wavelength selecting unit 10 by the second positioning unit 7b. In other words, when the ray 100 and the ray 200 become selected rays through the wavelength selecting unit 10, a combination of dominant wavelengths (wavelength corresponding to dominant component of wavelength spectrum) of the rays and the selected rays can be simultaneously changed. In the present embodiment, the ray 100 becomes the selected ray 101 through the second wavelength selection region 12b, and its dominant component is red light. The ray 200 becomes the selected ray 201 through the first wavelength selection region 12a, and its dominant component is blue light. Consequently, the combination is simultaneously changed compared to the case of the first embodiment.

The present embodiment has the effects of being able to inspect whether, for each pixel of the captured image, the surface 501 of the object 500 has the same inclining angle as that of the second plane 501b by using the corresponding color phase pixel value. Moreover, the present embodiment has the effects of being able to identify whether the inclination of the surface 501 of the object 500 is close to the second plane 501b or the first plane 501a.

On the other hand, reflected light from the first plane 501a can be adjusted to be incident to the first wavelength selection region 12a by moving the wavelength selecting unit 10 by the second positioning unit 7b. By doing so, there are the effects of being able to inspect whether, for each pixel of the captured image, the surface 501 of the object 500 has the same inclining angle as that of the first plane 501a by using the corresponding color phase pixel value. Moreover, there are the effects of being able to identify whether the inclination of the surface 501 of the object 500 is close to the first plane 501a or the second plane 501b. In other words, there are the effects of spreading a range of applicable inspection by the second positioning unit 7b.

Identification by color phase pixel values may be performed with higher accuracy by changing the position of the wavelength selecting unit 10 by the second positioning unit 7b. For example, when the surface 501 of the object 500 is hard to reflect red light but is easy to reflect blue light, the color phase pixel value of the selected ray 101 that is a red ray passing through the second wavelength selection region 12b becomes small, and the selected ray is buried in noise to decrease an S/N ratio. In that case, identification by color phase pixel values becomes difficult. Therefore, reflected light from the second plane 501b is adjusted to be incident to the first wavelength selection region 12a by moving the wavelength selecting unit 10 by the second positioning unit 7b. As a result, the selected ray 101 has the first wavelength as a dominant component to increase the color phase pixel value. As a result, there are the effects of improving identification accuracy by color phase pixel values.

As described above, there are the effects that inspection applicability to the shape of the object 500 by color phase pixel values is expanded by the second positioning unit 7b. Moreover, there are the effects that the accuracy of shape estimation is improved.

Even when the range of the adjustment by only the one positioning unit 7 is not enough and thus the inclination of the surface 501 of the object 500 cannot be inspected, inspection is advantageously enabled by simultaneously adjusting the first positioning unit 7a and the second positioning unit 7b. In other words, the inclination inspection of the surface 501 of the object 500 has the effects that the range of inclination that can be inspected is expanded by including both the first positioning unit 7a and the second positioning unit 7b.

Because a directly-facing positional relationship of the lighting unit 2 and the imaging unit 3 can be more finely adjusted, there are the effects that the accuracy of shape estimation of the surface 501 of the object 500 is improved.

As described above, the present embodiment has the effects that the directly-facing positional relationship of the lighting unit 2 and the imaging unit 3 can be adjusted with high precision and the inclination inspection of the surface 501 of the object 500 using color phase pixel values is enabled. Moreover, there are the effects that the inspectable range of the inclination of the surface 501 of the object 500 can be expanded. In other words, it can be said that the inclination of the surface 501 of the object 500 that could not be inspected is made to be inspectable. Moreover, there are the effects of improving the accuracy of shape estimation of the surface 501 of the object 500.

In the present embodiment, the imaging unit 3 includes the second positioning unit 7b, and the second positioning unit 7b determines the position of the wavelength selecting unit 10.

Third Embodiment

Hereinafter, the optical apparatus 1 according to the present embodiment will be described in detail with reference to FIGS. 8 and 9.

Figure 8:
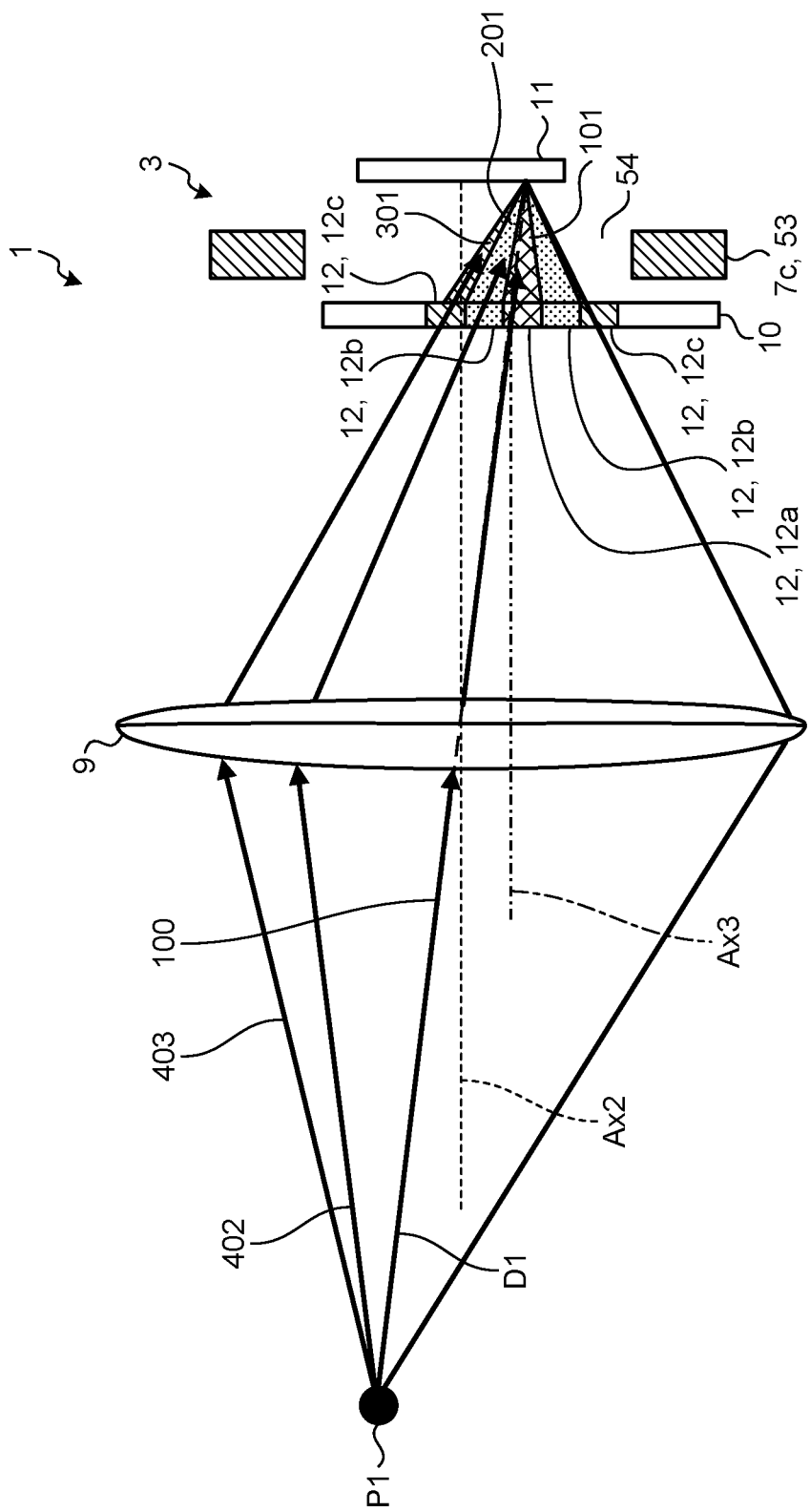
FIG. 8 is a diagram schematically illustrating an optical apparatus according to a third embodiment.

FIG. 8 is a diagram schematically illustrating the optical apparatus 1 according to the present embodiment. The optical apparatus 1 according to the present embodiment includes the lighting unit 2, the imaging unit 3, and the control device 4. The configuration of the present embodiment is basically the same as the configuration of the second embodiment, and a difference between the second embodiment and the present embodiment will be mainly described herein. Note that the lighting unit 2 may include the first positioning unit 7a that changes a relative position between the board member 20 and the light source but does not include it to clarify the effects of the present embodiment. In the present embodiment, the light source 5 of the lighting unit 2 is arranged on the optical axis Ax1, for example, and the ray emitting surface 6 is also arranged on the optical axis. Moreover, the wavelength selecting unit 10 includes a third wavelength selection region 12c as well as the first wavelength selection region 12a and the second wavelength selection region 12b. The first wavelength selection region 12a, the second wavelength selection region 12b, and the third wavelength selection region 12c respectively select different wavelengths.

It is assumed that a ray is reflected at the object point P1 on the surface 501 of the object 500. Note that the surface 501 of the object 500 is not a mirror surface but a diffusing surface that diffuses light. For that reason, when the ray is incident at the object point P1, scattered light is generated. In other words, rays reflected at the object point P1 have simultaneously a specular component and scattering components. The specular component passes through the imaging optical element 9 and becomes the selected ray 101 by the first wavelength selection region 12a, and the selected ray is emitted and its image is formed on the sensor 11. The scattered light components are second reflected light 402 and third reflected light 403, for example, pass through the imaging optical element 9, respectively pass through the second wavelength selection region 12*b* and the third wavelength selection region 12*c* to become the selected ray 201 and a third selected ray 301, and their images are formed on the sensor 11.

It is assumed that the wavelength selecting unit 10 has 180-degree rotation symmetry around the first wavelength selection region 12*a*. In other words, the wavelength selecting unit 10 can be rotated on a paper surface around the first wavelength selection region 12*a*. By doing so, when a rotation angle is 180 degrees, the arrangement of regions is the same as the original arrangement. As described above, a case where the arrangement having a rotation angle less than 360 degrees is the same as the original arrangement when rotation is performed with respect to a certain axis is called rotation symmetry. As an example in which the wavelength selecting unit 10 has rotation symmetry, when the wavelength selection regions 12 are on the same plane, the regions have a concentric circular shape, a symmetric line shape, or the like. Alternatively, the regions may have a symmetric grid pattern. Herein, an optical axis Ax3 of the wavelength selecting unit 10 is parallel to the optical axis Ax2 of the imaging optical element 9.

Under the above configuration, an operation of the present embodiment will be described.

It is known that the intensity distribution and wavelength spectrum distribution of scattering components are substantially axial symmetry in many cases by using a specular direction Dl as an axis when rays are scattered on the object point P1. For that reason, the scattered light depends on only an angle of the ray with respect to the specular direction Dl. In other words, the intensities and wavelength spectra of the second reflected light 402 and the third reflected light 403 are different, but are substantially axial symmetry centering on the specular direction Dl.

In the present embodiment, the specular component is incident to the first wavelength selection region 12*a* and becomes the selected ray 101. On the other hand, the scattering components become symmetric around the first wavelength selection region 12*a*. The wavelength selection regions 12 are arranged to become symmetric around the first wavelength selection region 12*a*. From this, among the scattering components passing through the wavelength selecting unit 10, scattering components having substantially the same wavelength spectrum are collected and their images are formed on the sensor 11. In other words, the color phase pixel values of scattering components can be increased. As a result, in relation to ray direction dependence of scattering components, there are the effects that signals having a high S/N ratio can be acquired.

A quantity called BRDF (Bidirectional Reflectance Distribution Function) is defined as a quantitative index indicative of ray direction dependence of scattering component and specular component. The BRDF heavily depends on the material of the object 500 and the state of the surface 501. For that reason, there are the effects that the material of the object 500 and the state of the surface 501 can be known by acquiring the BRDF. In particular, when the surface 501 of the object 500 has a concavo-convex defect, the BRDF greatly changes. For that reason, there are the effects that the defect inspection of the surface 501 of the object 500 is enabled.

As described above, because a specular component is incident to the first wavelength selection region 12*a* that is the center of the symmetric wavelength selecting unit 10, an S/N ratio is improved. According to the present embodiment, a specular component can be adjusted to pass through the first wavelength selection region 12*a* by moving the wavelength selecting unit 10 by the second positioning unit 7*b*. For that reason, the improvement of an S/N ratio can be achieved with respect to an arbitrary diffusing surface. On the other hand, because such the adjustment cannot be performed if there is not the second positioning unit 7*b*, only the specified diffusing surface can be inspected. In other words, the present embodiment has an advantage that the surface 501 of the object 500 having the arbitrary specular direction Dl can be inspected.

Next, the flow of processing that is executed by the processing module 4*a* will be described with reference to FIG. 9. FIG. 9 is a flowchart illustrating processing that is executed by the processing module 4*a* of the optical apparatus 1 according to the present embodiment.

First, before the processing module 4*a* executes the processing, the control device 4 determines the positions of the wavelength selection regions 12 by using the positioning unit 7 of the imaging unit 3. Next, based on the position information of the wavelength selection regions 12 and the position information of the ray emitting surface 6 of the lighting unit 2, the control device 4 determines a relationship between the wavelength selection regions 12 and the directions of the rays reflected by the surface 501 of the object 500. The wavelength spectra of the selected rays passing through the wavelength selection regions 12 of the wavelength selecting unit 10 can be identified by using the color phase pixel values. For that reason, a relationship between color phase pixel values and ray directions is determined.

Figure 9:
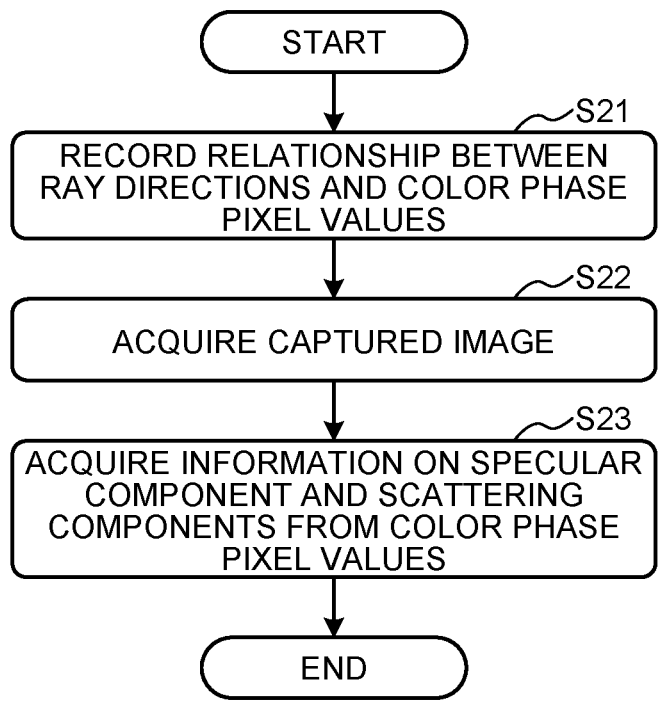
FIG. 9 is a flowchart illustrating processing that is executed by a processing module of the optical apparatus according to the third embodiment.

Then, as illustrated in FIG. 9, the processing module 4*a* records the relationship between ray directions and color phase pixel values (Step S21). Then, the processing module 4*a* acquires a captured image (Step S22) and acquires a color phase pixel value of each pixel. The processing module 4*a* calculates ray directions from the color phase pixel values by using the previously recorded relationship between color phase pixel values and ray directions, and acquires information on a specular component and scattering components (Step S23). In other words, there are the effects of being able to acquire the BRDF of the object point P1.

When calculating the ray directions from the color phase pixel values, there may be performed arithmetic processing by which the influence of color distribution, reflectance distribution, etc. of the surface 501 of the object 500 becomes less susceptible. For example, a transparent region is provided in the wavelength selecting unit 10, and the wavelength selecting unit 10 is moved by the positioning unit 7 so that all rays received by the sensor 11 pass through the transparent region. When the wavelength selecting unit 10 can electrically control independently wavelength regions by using the SLM etc., there are the effects of being able to instantly switch all the wavelength regions to transparent regions and capturing an image. Then, a captured image in that case is acquired, and then assignment is performed so that the wavelength selection regions 12 of the wavelength selecting unit 10 have transmissive wavelength spectra different from each other to acquire an image. Then, the influence of color distribution and reflectance distribution of the surface 501 of the object 500 can be reduced by calculating a difference between both the images. Alternatively, a threshold may be set for a pixel value of each color phase of the color phase pixel values to offset it. As a result, an effect of reducing background noise is obtained.

As described above, the processing module 4*a* acquires information on ray directions of scattered light scattered on the surface 501 by using the color phase information.

Fourth Embodiment

Hereinafter, the optical apparatus 1 according to the present embodiment will be described in detail with reference to FIGS. 10 to 12.

Figure 10:
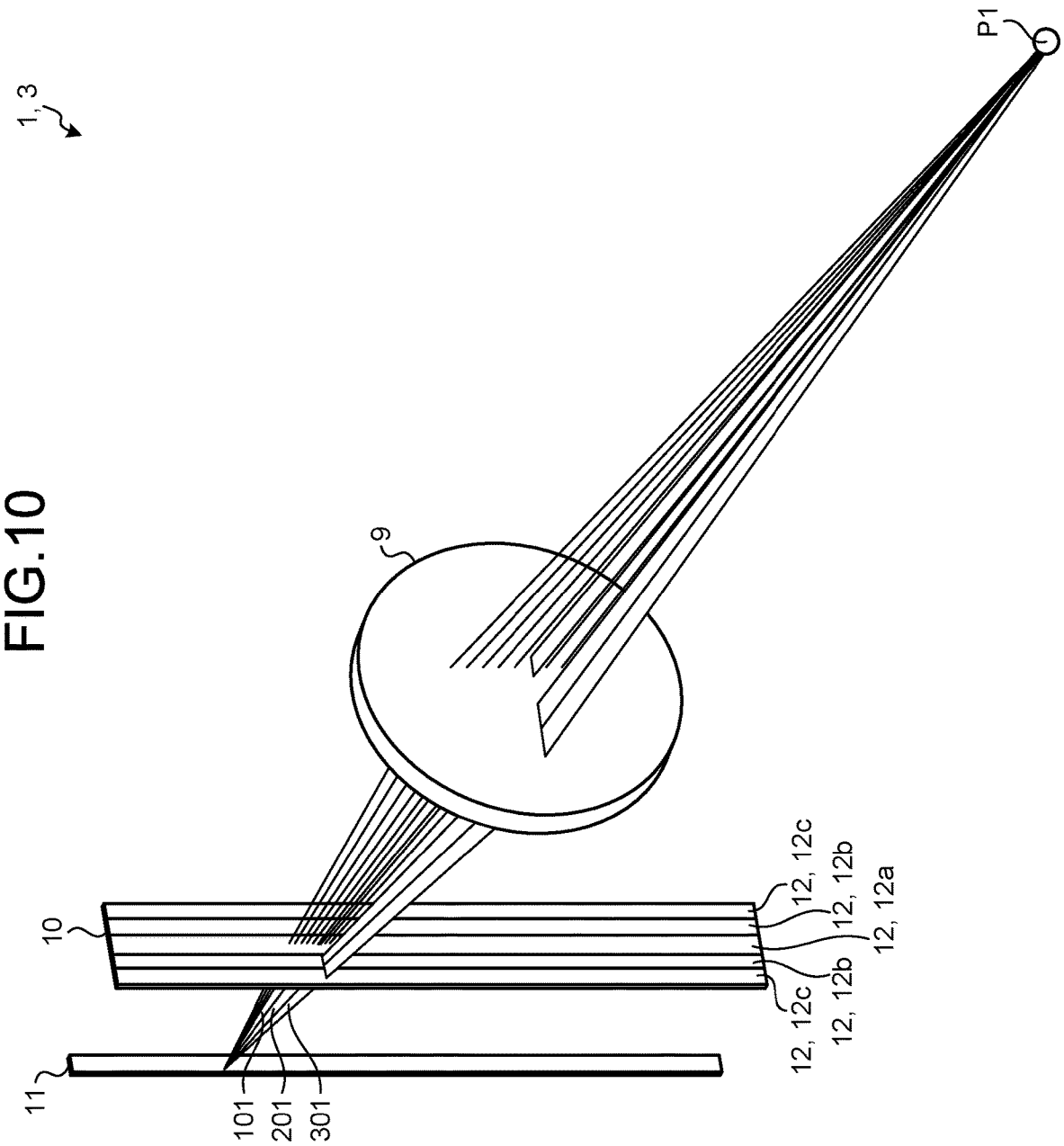
FIG. 10 is a perspective view schematically illustrating a portion of an optical apparatus according to a fourth embodiment.

FIG. 10 is a perspective view schematically illustrating a portion of the optical apparatus according to the present embodiment. The optical apparatus of the present embodiment includes the lighting unit 2, the imaging unit 3, and the control device 4. The configuration of the present embodiment is basically the same as the configuration of the first embodiment, and a difference between the first embodiment and the present embodiment will be mainly described herein.

The wavelength selecting unit 10 of the imaging unit 3 includes the plurality of rectangular wavelength selection regions 12. The plurality of wavelength selection regions 12 include the first wavelength selection region 12a, the second wavelength selection region 12b, and the third wavelength selection region 12c. Note that the regions can be regarded as a line when the short side of the rectangle is substantially sufficiently small. The wavelength selection regions 12 are 180-degree rotation symmetry, for example. In other words, when a rotation axis that passes through the center of the first wavelength selection region 12a and is perpendicular to this region is taken, a state where the wavelength selection regions 12 are rotated by 180 degrees with respect to the rotation axis is identical to the original state. As a result, the BRDF of scattered light can be acquired with high precision.

The plurality of wavelength selection regions 12 are lined up in a row. The sensor 11 is a line sensor.

Hereinafter, an operation of the present embodiment will be described.

Figure 11:
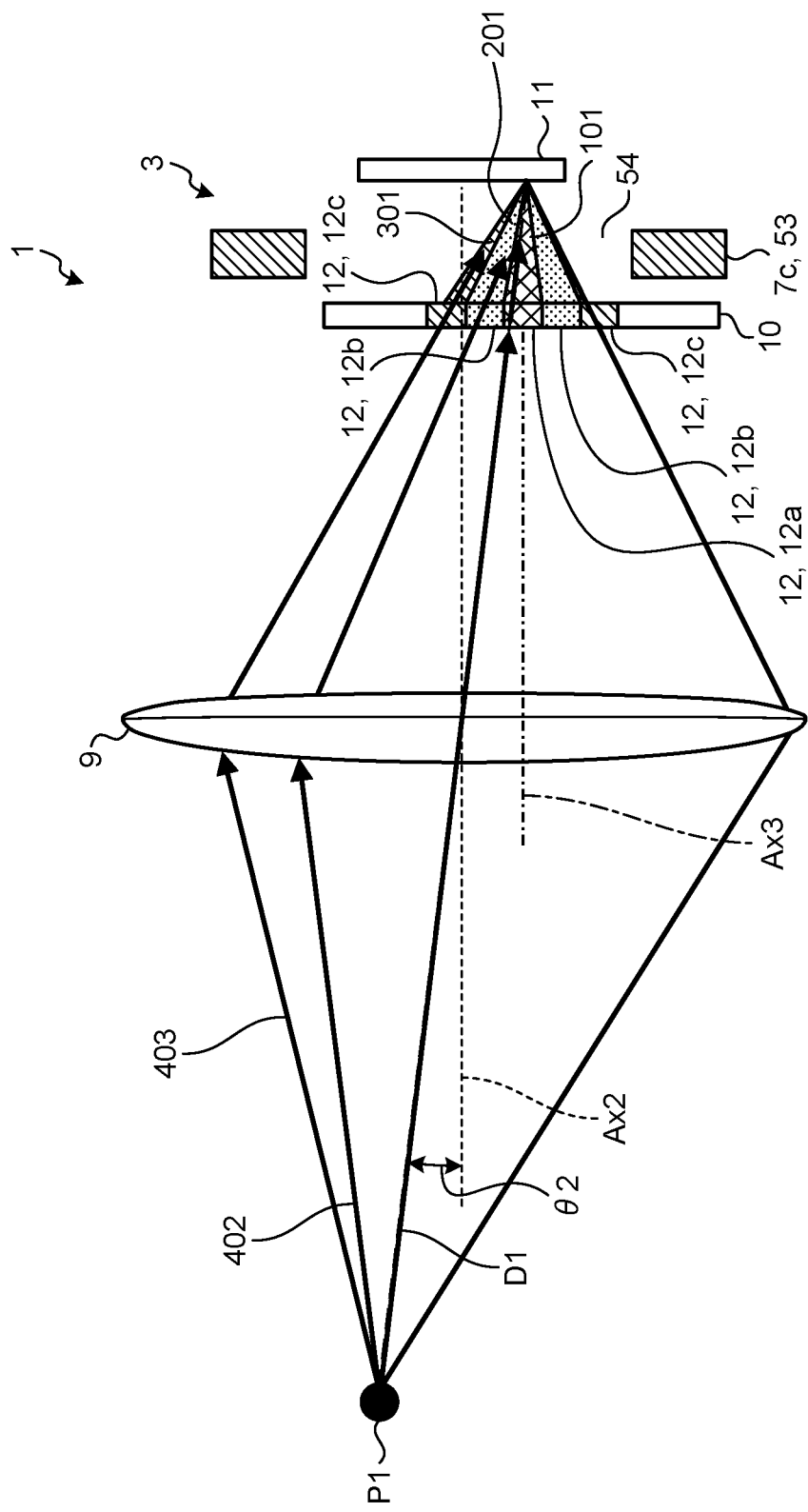
FIG. 11 is a top view schematically illustrating the portion of the optical apparatus according to the fourth embodiment.

FIG. 11 is a top view schematically illustrating the portion of the optical apparatus 1 according to the fourth embodiment. FIG. 12 is a cross-sectional view schematically illustrating the portion of the optical apparatus 1 according to the fourth embodiment. The portion illustrated in the top view of FIG. 11 performs the same operation as that described in the third embodiment. Herein, an angle between the specular direction D1 and the optical axis Ax2 is an angle θ2. Moreover, the optical axis Ax3 that is an axis of the wavelength selecting unit 10 is taken to pass through the center of the first wavelength selection region 12a and to be perpendicular to the first wavelength selection region 12a. A distance between the axis of the wavelength selecting unit 10 and the optical axis Ax2 can be controlled by the second positioning unit 7b. All rays parallel to the specular direction D1 pass through the first wavelength selection region 12a by the imaging optical element 9. In order to be able to estimate the ray directions by using the color phase pixel values, rays are at least required to pass through the wavelength selection regions 12 of the wavelength selecting unit 10 and to reach the sensor 11. In other words, because rays that cannot pass through the wavelength selection regions 12 are increased when the angle θ2 is large, an S/N ratio may go down.

Figure 12:
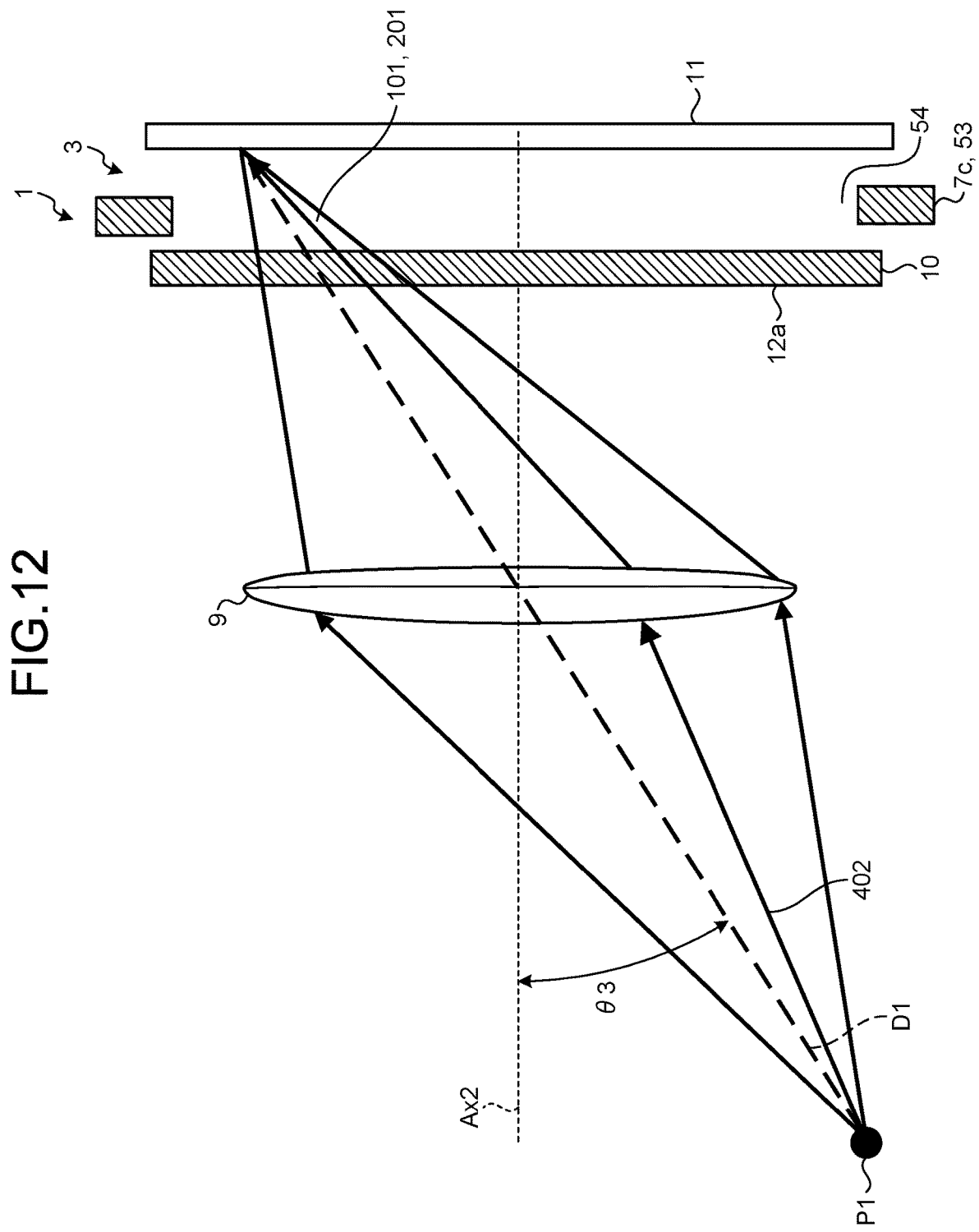
FIG. 12 is a cross-sectional view schematically illustrating the portion of the optical apparatus according to the fourth embodiment.

A portion corresponding to the side surface illustrated in FIG. 12 operates similar to a normal imaging optics system. In other words, an image of diverging light from the object point P1 is formed on the sensor 11 placed on an image plane by the imaging optical element 9. Herein, an angle between the optical axis Ax2 and a principal ray (line connecting an image point and the object point P1) is regarded as an angle θ3. The angle θ3 is changed by the imaging optical element 9 within a range in which the rays can reach the sensor 11, and is not limited by the wavelength selection regions 12. In other words, a wide angle of view can be taken for the ray as viewed from the side surface as illustrated in FIG. 12. On the other hand, for example, the wavelength selection regions 12 are assumed to be axial symmetry and concentric circles. At this time, a significant ray is subject to two restrictions by the wavelength selection regions 12 and the sensor 11 on any of top and side surfaces. Compared to that, because a ray (ray viewed from the side surface) in one axial direction is not subject to a restriction by the wavelength selection regions 12, the present embodiment has the effects that an angle of view in the axial direction can be widely taken.

Fifth Embodiment

Figure 13:
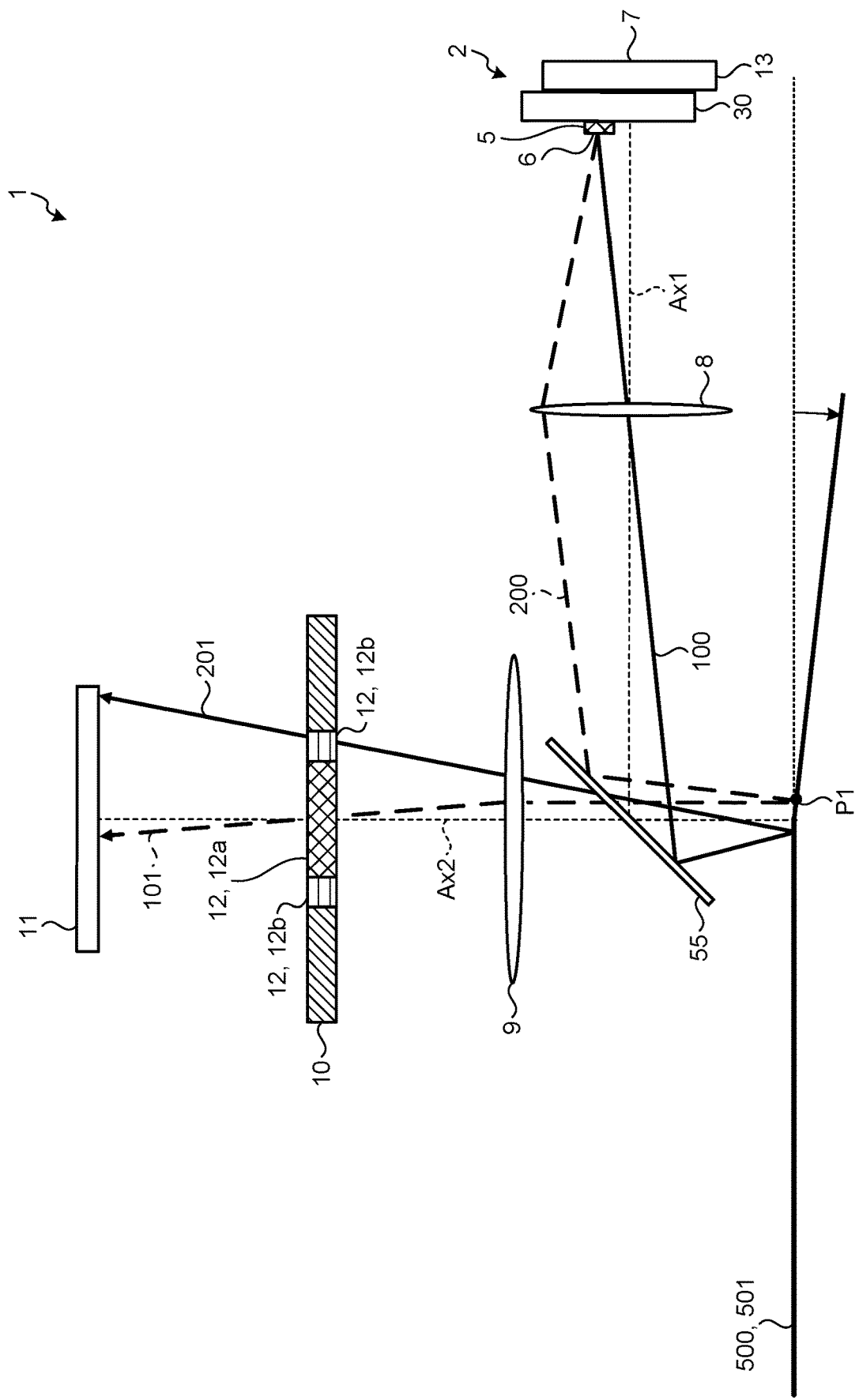
FIG. 13 is a diagram schematically illustrating an optical apparatus according to a fifth embodiment.

Hereinafter, the optical apparatus 1 according to the present embodiment will be described in detail with reference to FIG. 13. FIG. 13 is a diagram schematically illustrating the optical apparatus 1 according to the present embodiment.

The optical apparatus of the present embodiment includes the lighting unit 2, the imaging unit 3, and the control device 4. The configuration of the present embodiment is basically the same as the configuration of the first embodiment, and a difference between the first embodiment and the present embodiment will be mainly described herein.

The optical apparatus 1 according to the present embodiment includes a beam splitter 55. The beam splitter 55 is arranged between the light source 5 and the imaging optical element 9 in the optical path of the illumination rays. The beam splitter 55 does not depend on polarized light of a ray. However, the embodiment is not limited to this, and the beam splitter may depend on the polarized light.

The imaging optical element 8 and the imaging optical element 9 are arranged so that the optical axis Ax1 and the optical axis Ax2 intersect with each other. Moreover, the beam splitter 55 is arranged near a point of intersection between the optical axis Ax1 and the optical axis Ax2.

With the above configuration, with respect to the object point P1 where the illumination ray is reflected by the surface 501 of the object 500, a direction toward the object point P1 from the imaging unit 3 and a direction in which the illumination ray heads for the object point P1 can be made to be along each other by the beam splitter 55. In other words, the beam splitter 55 can cause the ray direction of the illumination ray just before being reflected by the surface 501 to be along the direction from the imaging unit 3 toward a point where the illumination ray is reflected by the surface 501. In other words, a range of a directly-facing positional relationship that can be taken by the illumination ray and the imaging unit 3 can be broadened by the beam splitter 55.

Sixth Embodiment

Figure 14:
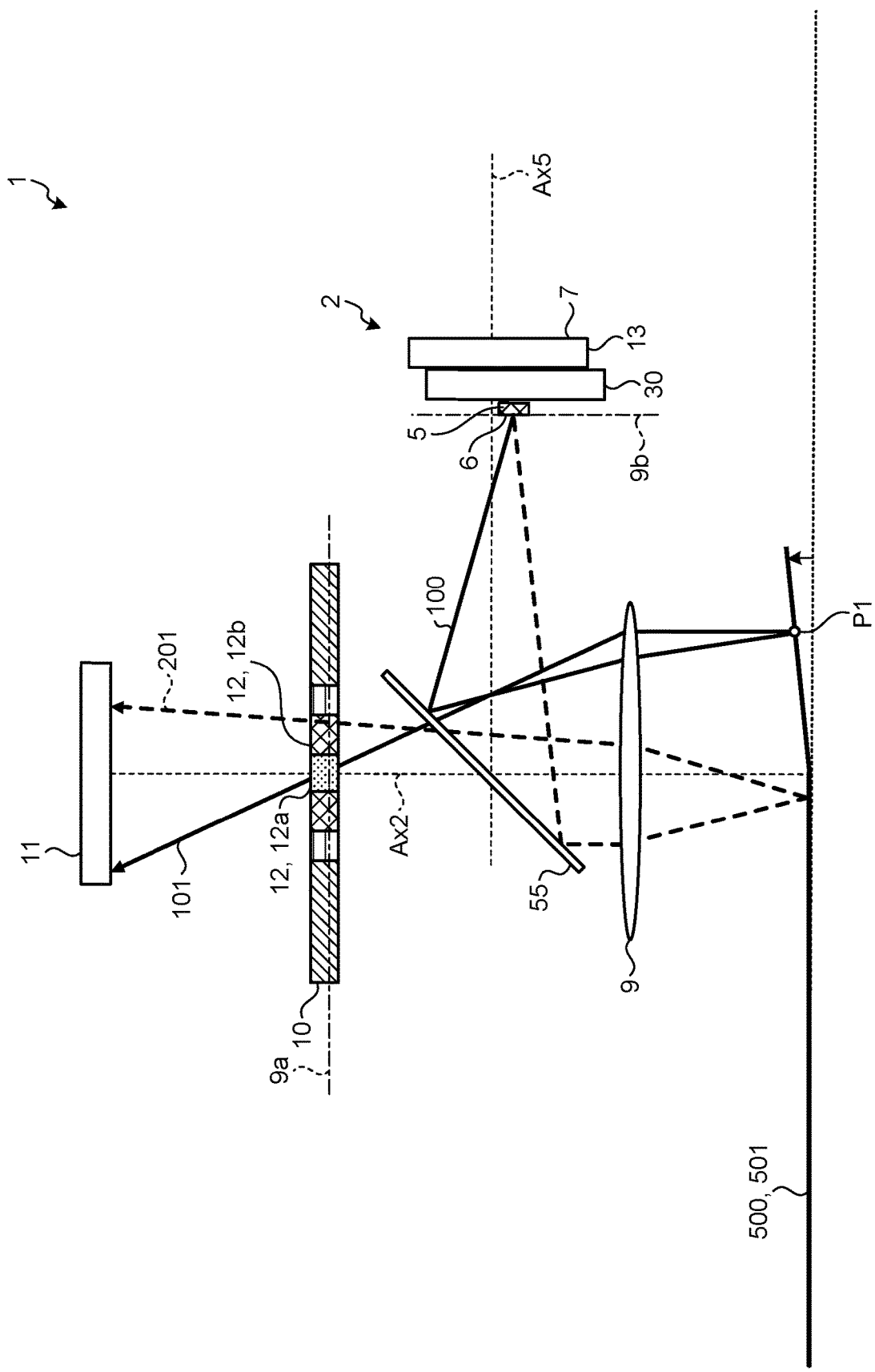
FIG. 14 is a diagram schematically illustrating an optical apparatus according to a sixth embodiment.

Hereinafter, the optical apparatus 1 according to the present embodiment will be described in detail with reference to FIG. 14. FIG. 14 is a diagram schematically illustrating the optical apparatus 1 according to the present embodiment.

The optical apparatus of the present embodiment includes the lighting unit 2, the imaging unit 3, and the control device 4. The configuration of the present embodiment is basically the same as the configuration of the first embodiment, and a difference between the first embodiment and the present embodiment will be mainly described herein.

The optical apparatus of the present embodiment includes the beam splitter 55. The beam splitter 55 is arranged between the imaging optical element 9 and the wavelength selecting unit 10 in the optical path of the illumination rays. The beam splitter 55 does not depend on polarized light of a ray. However, the embodiment is not limited to this, and the beam splitter may depend on the polarized light.

The imaging optical element 9 is arranged so that the optical axis Ax2 and an axis Ax5 along the optical axis of the light source 5 intersect with each other. Moreover, the beam splitter 55 is arranged near a point of intersection between the optical axis Ax2 and the axis Ax5.

The wavelength selection regions 12 are arranged on the substantial focal plane 9a of the imaging optical element 9, and the ray emitting surface 6 is arranged on a substantial focal plane 9b of the imaging optical element 9 along the ray path broken by the beam splitter 55. In other words, the ray emitting surface 6 of the lighting unit 2 is arranged on the focal plane 9b of the imaging optical element 9 along the ray path broken by the beam splitter 55. In other words, the ray emitting surface 6 is arranged on the focal plane 9b of the imaging optical element 9 along the ray path broken by the beam splitter 55. From this, the imaging optical element 9 and the imaging optical element 8 (not illustrated in FIG. 14) can be commonalized, and the imaging optical element 8 can be omitted. In other words, there are the effects that the optical apparatus can be compactified.

With the above configuration, with respect to the object point P1 where the illumination ray is reflected by the surface 501 of the object 500, a direction toward the object point P1 from the imaging unit 3 and a direction in which the illumination ray heads for the object point P1 can be made to be along each other. In other words, a range that can be taken by a directly-facing positional relationship of the illumination ray and the imaging unit 3 can be broadened by the beam splitter 55.

Seventh Embodiment

Figure 15:
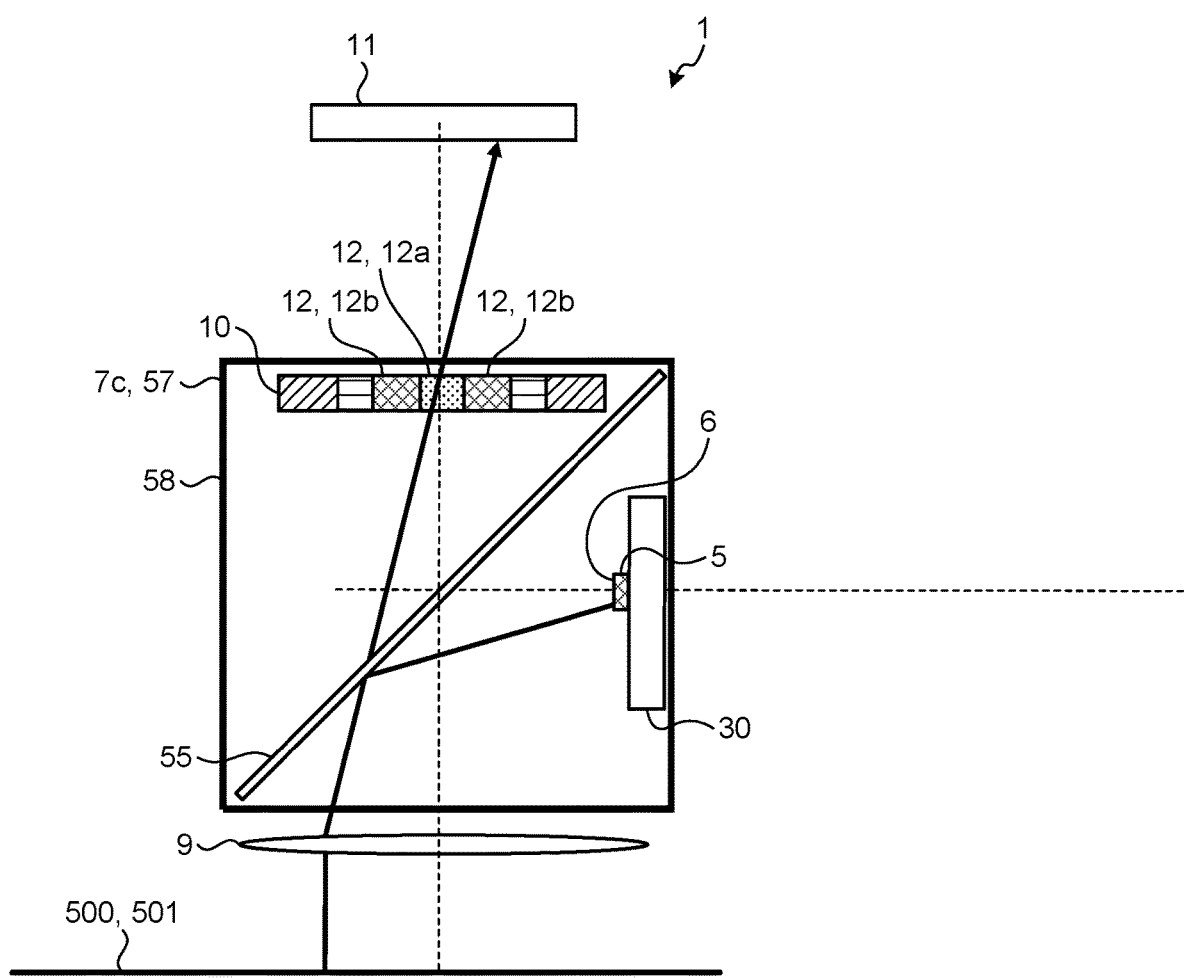
FIG. 15 is a diagram schematically illustrating an optical apparatus according to a seventh embodiment.
Figure 16:
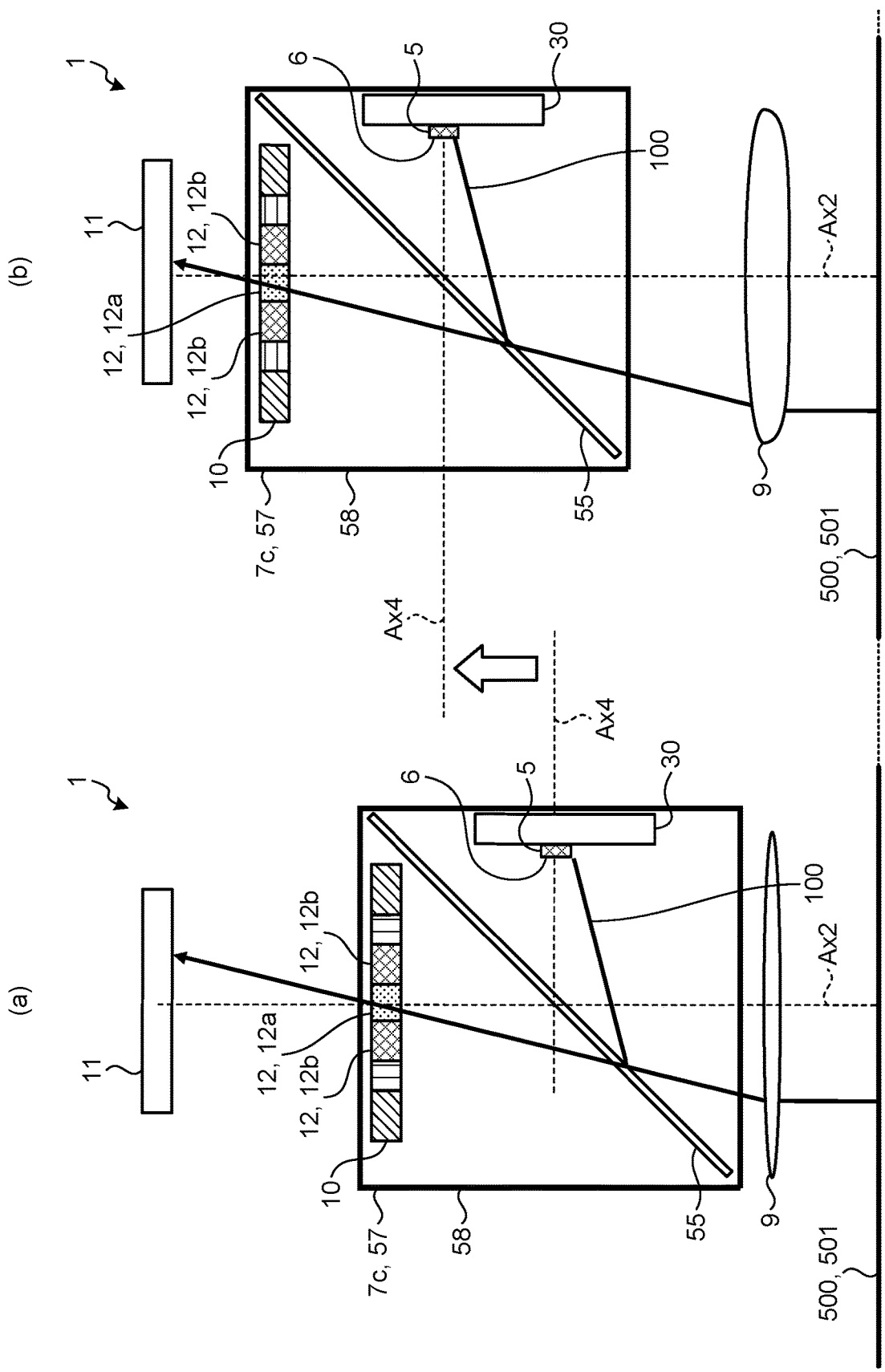
FIG. 16 is an explanatory view explaining a movement of a movable unit in the optical apparatus according to the seventh embodiment.

Hereinafter, the optical apparatus 1 according to the present embodiment will be described in detail with reference to FIGS. 15 and 16. FIG. 15 is a diagram schematically illustrating the optical apparatus 1 according to the present embodiment.

The optical apparatus of the present embodiment includes the lighting unit 2, the imaging unit 3, and the control device 4. The configuration of the present embodiment is basically the same as the configuration of the sixth embodiment, and a difference between the sixth embodiment and the present embodiment will be mainly described herein.

In the present embodiment, a positioning unit 7c includes a movable unit 57. The movable unit 57 is movably supported by a support member not illustrated. The movable unit 57 includes a support member 58, the light source 5, the board 30, the beam splitter 55, and the wavelength selecting unit 10. The support member 58 supports the light source 5, the board 30, the beam splitter 55, and the wavelength selecting unit 10. In detail, the light source 5, the board 30, the beam splitter 55, and the wavelength selecting unit 10 are fixed to the support member 58. In other words, the movable unit 57 is unitized to be able to move relative to the imaging optical element 9 and the sensor 11 while a relative positional relationship between the ray emitting surface 6 and the wavelength selecting unit 10 is maintained. In other words, it may be said that the positioning unit 7c is one obtained by commonalizing the first positioning unit 7a (FIG. 7) and the second positioning unit 7b (FIG. 7).

As described above, the positioning unit 7c includes the movable unit 57 that includes the ray emitting surface 6 and the wavelength selection regions 12. The movable unit 57 can move along the optical axis Ax2 of the imaging optical element 9 in a state where the relative position between the ray emitting surface 6 and the wavelength selection regions 12 is maintained.

The imaging optical element 9 is a lens whose focal position is variable. For example, the imaging optical element may be a group lens such as a zoom lens. Alternatively, the imaging optical element may be one, whose focal position can be variable by electrical control, such as a liquid lens. Herein, the imaging optical element 9 is a liquid lens, for example.

An operating principle of the present embodiment will be described with reference to FIG. 16. FIG. 16 is an explanatory view explaining a movement of the movable unit 57 in the optical apparatus 1 according to the present embodiment. FIG. 16 illustrates the state of the movement of the movable unit 57. Specifically, a state where the movable unit 57 moves from the position of (a) of FIG. 16 to the position of (b) of FIG. 16 is illustrated. FIG. 16 is an example in which the movable unit 57 is moved so that an optical axis Ax4 of the light source 5 moves along the axial direction of the optical axis Ax2 of the imaging optical element 9. At this time, even if the position of the focal plane of the imaging optical element 9 is changed, the effects of maintaining a relationship between the ray direction of the illumination ray and the wavelength selection regions 12 are obtained if the movable unit 57 is moved along the optical axis Ax2. As a result, there is an advantage that a working distance and an optical magnification can be variable.

Eighth Embodiment

Figure 17:
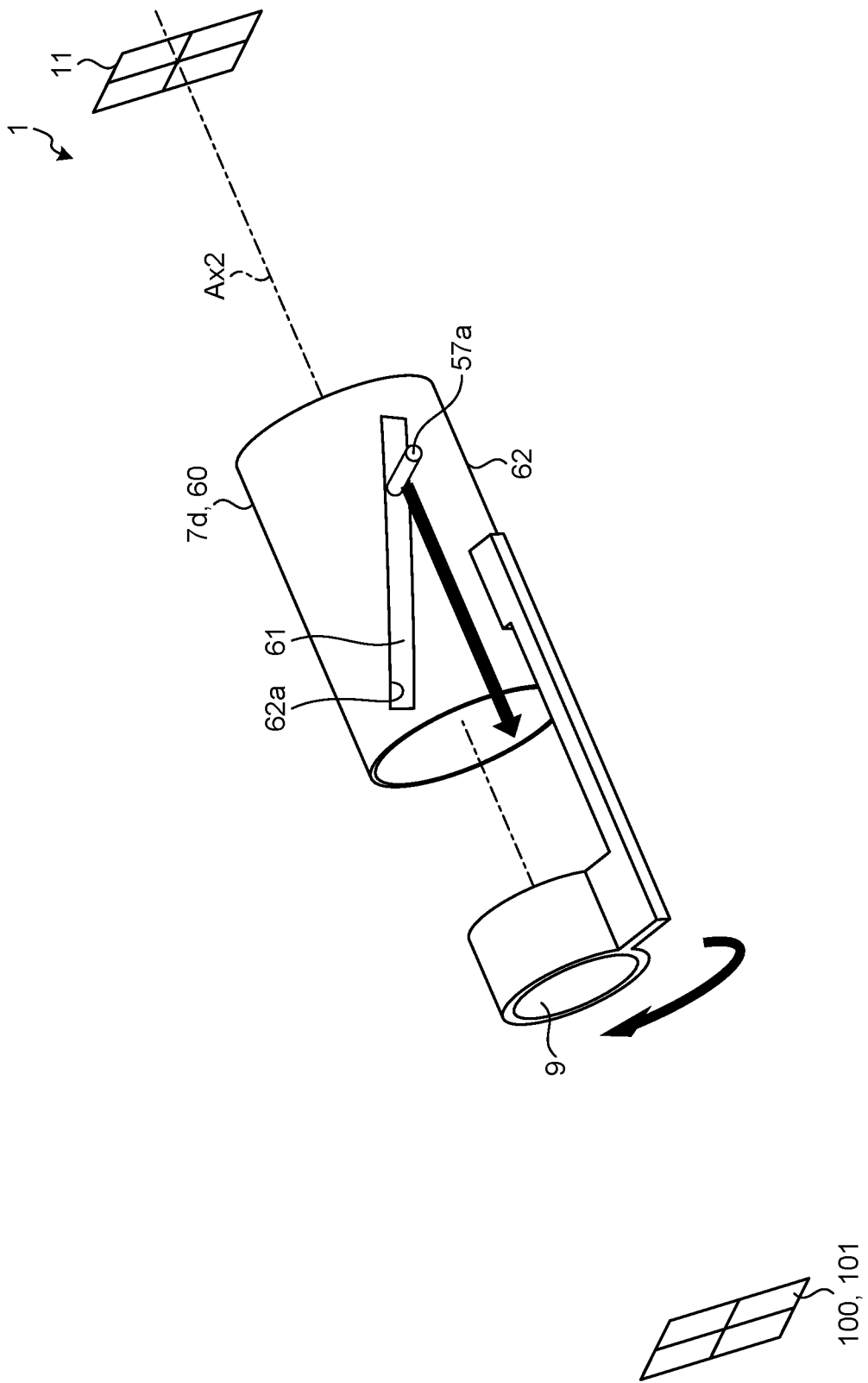
FIG. 17 is a perspective view schematically illustrating an optical apparatus according to an eighth embodiment.
Figure 18:
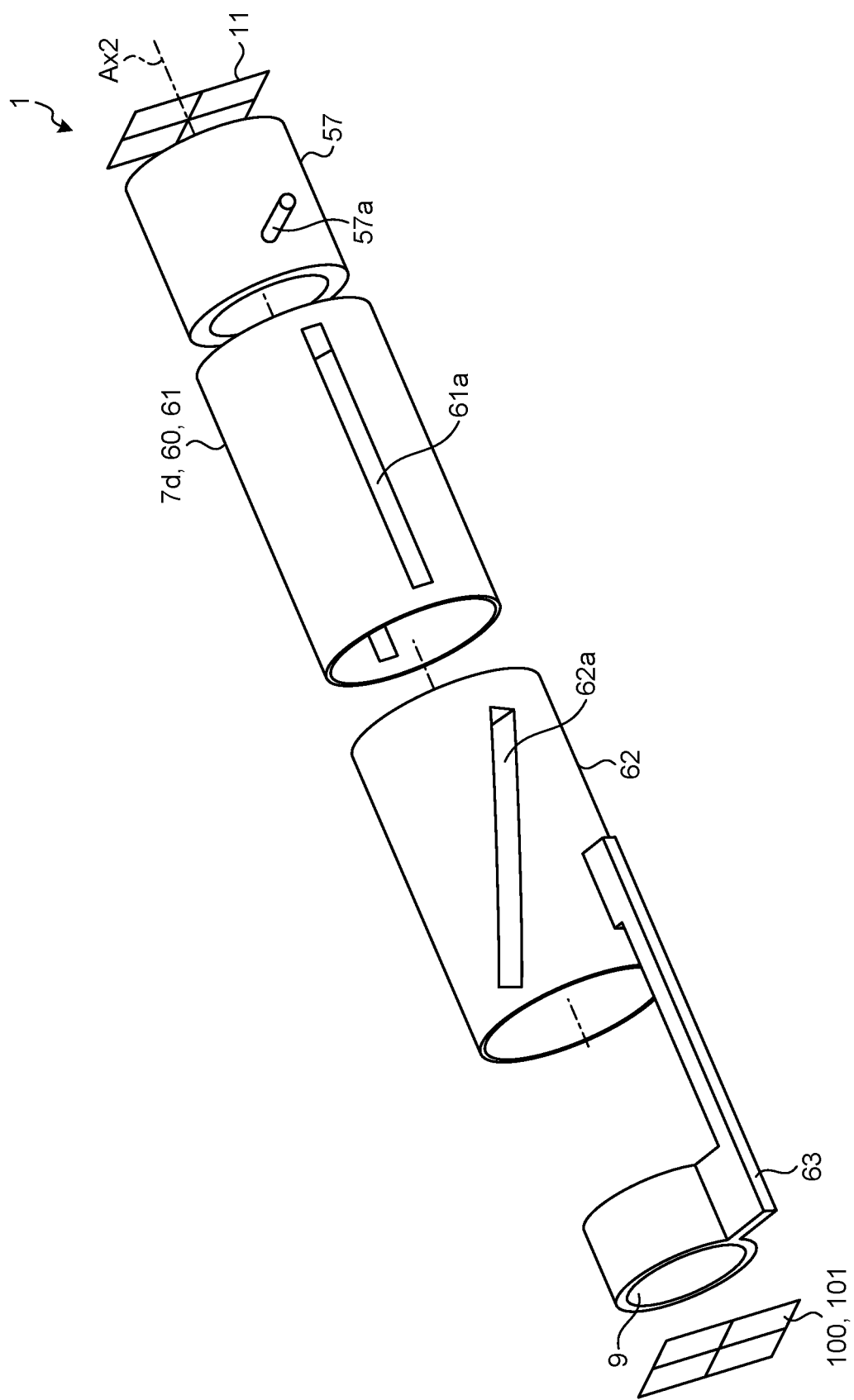
FIG. 18 is an exploded perspective view schematically illustrating the optical apparatus according to the eighth embodiment.

Hereinafter, the optical apparatus 1 according to the present embodiment will be described in detail with reference to FIGS. 17 and 18. FIG. 17 is a perspective view schematically illustrating the optical apparatus 1 according to the present embodiment. FIG. 18 is an exploded perspective view schematically illustrating the optical apparatus 1 according to the present embodiment.

The optical apparatus 1 according to the present embodiment includes the lighting unit 2, the imaging unit 3, and the control device 4. The configuration of the present embodiment is basically the same as the configuration of the seventh embodiment, and a difference between the seventh embodiment and the present embodiment will be mainly described herein.

In the present embodiment, the imaging optical element 9 is a zoom lens. The imaging optical element 9 can change a focal length by a positioning unit 7d.

The positioning unit 7d includes a variable part 60. The variable part 60 includes a first member 61, a second member 62, a rotating lever 63, and the movable unit 57.

The first member 61 is formed in a cylindrical shape, and houses therein the movable unit 57. The movable unit 57 includes a pin 57a. The first member 61 is provided with a slit 61a into which the pin 57a is inserted. The first member 61 supports the pin 57a, consequently, the movable unit 57 to be movable along the optical axis Ax2. In other words, the movable unit 57 slides in the uniaxial direction via the slit 61a of the first member 61. Moreover, the first member 61 and the sensor 11 are fixed to each other.

The second member 62 is formed in a cylindrical shape, and houses therein the first member 61. In other words, the second member 62 is arranged outside of the first member 61. The second member 62 is provided with a slit 62a into which the pin 57a is inserted. The second member 62 supports the pin 57a, consequently, the movable unit 57 and the first member 61 to be rotatable around the optical axis Ax2.

The rotating lever 63 is fixed to the second member 62. The imaging optical element 9 is fixed to the rotating lever 63.

With such a configuration, the second member 62 is rotated by the rotating lever 63. Moreover, when the second member 62 is rotated by the rotating lever, the movable unit 57 moves in the uniaxial direction along the slit 61a of the first member 61. In other words, the movable unit 57 and the imaging optical element 9 can relatively rotate while moving in the uniaxial direction. A relative focal length with the imaging optical element 9 is changed by rotating the rotating lever 63. The movable unit 57 moves following it. The movable unit 57 can be moved in accordance with a change in the distance of the focal plane of the imaging optical element 9 by making the second slit rotating by the rotating lever 63 a proper shape. In other words, the movable unit 57 moves along the axis Ax2 in accordance with a movement of the focal plane of the imaging optical element 9 accompanied with a change in the zooming magnification of the imaging optical element 9.

Ninth Embodiment

Figure 19:
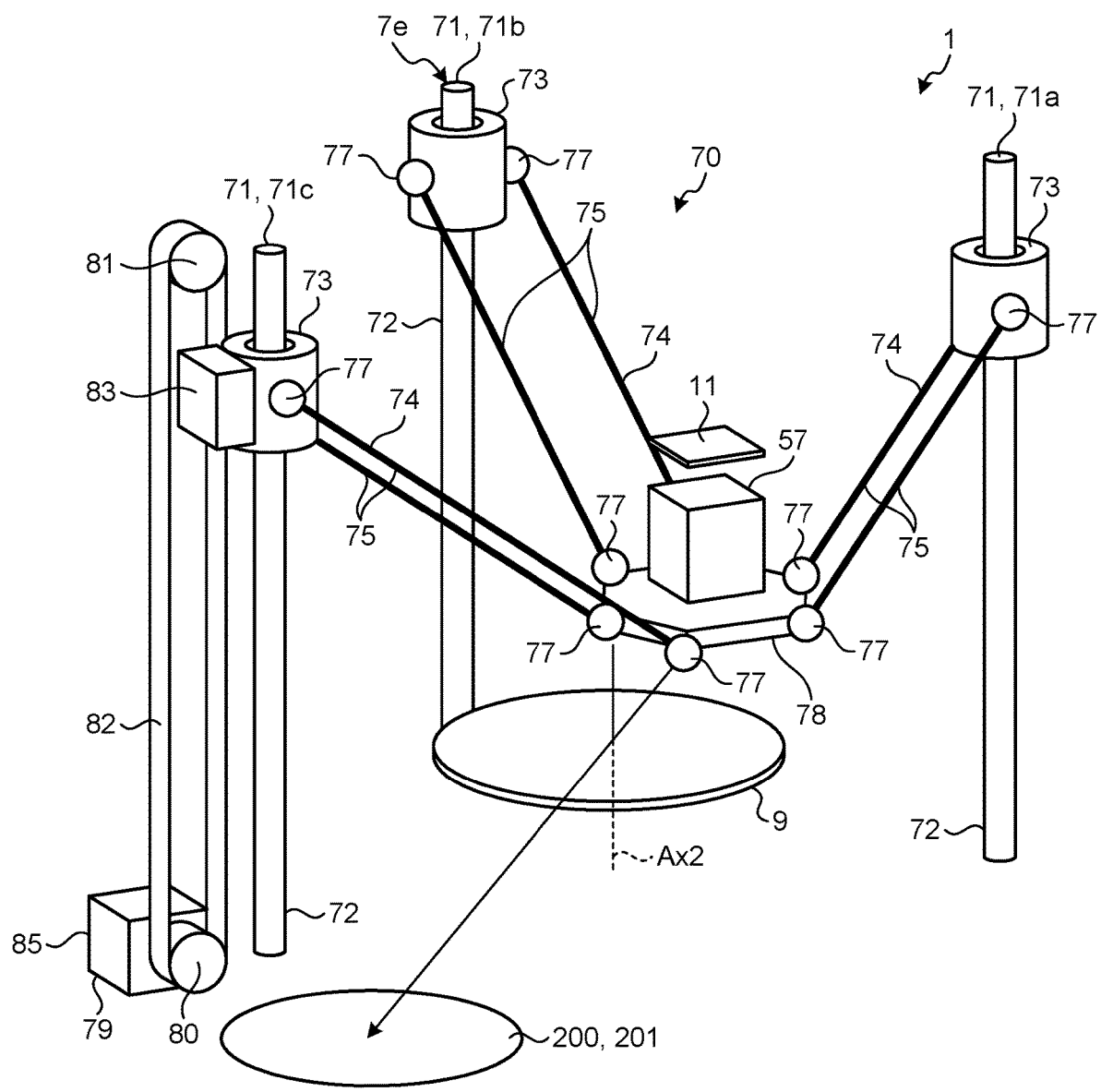
FIG. 19 is a perspective view schematically illustrating an optical apparatus according to a ninth embodiment.

Hereinafter, the optical apparatus 1 according to the present embodiment will be described in detail with reference to FIG. 19. FIG. 19 is a perspective view schematically illustrating the optical apparatus 1 according to the present embodiment.

The optical apparatus of the present embodiment includes the lighting unit 2, the imaging unit 3, and the control device 4. The configuration of the present embodiment is basically the same as the configuration of the seventh embodiment, and a difference between the seventh embodiment and the present embodiment will be mainly described herein.

A positioning unit 7e includes a parallel link mechanism 70, a driving unit 85, and the control device 4. The positioning unit 7e moves the movable unit 57 relative to the imaging optical element 9. In addition, in the present embodiment, the movable unit 57 includes the sensor 11.

The parallel link mechanism 70 includes a plurality (e.g., three) of support mechanisms 71. The three support mechanisms 71 include a first support mechanism 71a, a second support mechanism 71b, and a third support mechanism 71c. The parallel link mechanism 70 supports the movable unit 57 by the three support mechanisms 71. The three support mechanisms 71 can change the position and posture of the movable unit 57 inside a predetermined space. In this way, the three support mechanisms 71 are made of the same parts. For this reason, the structure of the parallel link mechanism 70 becomes simple and produces a cost reduction effect.

Each of the support mechanisms 71 includes a rail member 72, a slider 73, and a robot arm 74. In other words, the parallel link mechanism 70 includes three rail members 72, three sliders 73, and three robot arms 74. The rail member 72 is supported by a base not illustrated, the slider 73 is supported by the rail member 72, and the robot arm 74 is supported by the slider 73. Moreover, the robot arms 74 support the movable unit 57.

The rail member 72 is supported by the base to be rotatable around the rotation center along the optical axis Ax2 of the imaging optical element 9.

The slider 73 is connected to (supported by) the rail member 72 to be movable along the rail member 72 and is connected to (supported by) the rail member 72 to be rotatable around the rail member.

The slider 73 of the third support mechanism 71c is moved along the rail member 72 by the driving unit 85.

The driving unit 85 includes a motor 79, a gear 80 connected to the motor 79, a pulley 81, a timing belt 82, and a connecting part 83. The motor 79 is a stepping motor. The timing belt 82 is hung on the gear 80 and the pulley 81, and the connecting part 83 connects the timing belt 82 and the slider 73. With such a configuration, by rotating the motor 79, the gear 80 rotates and the timing belt 82 moves. As a result, the slider 73 moves along the rail member 72.

Each of the robot arms 74 includes two rods 75. Each of the rods 75 is connected to the slider 73 and a stage 78 by corresponding joint parts 77. The joint part 77 is a ball joint. The movable unit 57 is fixed to the stage 78.

As described above, the optical apparatus 1 includes the parallel link mechanism 70 that includes the plurality of rods 75 connected to the movable unit 57 and moves the movable unit 57, the driving unit 85 that drives the parallel link mechanism 70, and the control device 4 that controls the driving unit 85. The movable unit 57 includes the sensor 11.

Hereinafter, an operating principle of the present embodiment will be described. As described above, the two rods 75 as one pair are attached to each of the sliders 73 to be parallel to each other. Moreover, other ends of the rods 75 are jointed to the stage 78. Furthermore, it is assumed that the lengths of the rods 75 are the same. In other words, because the two rods 75 of each pair are parallel and have the same length, this leads to drawing a parallelogram.

In the present embodiment, one pair of the rods 75 is attached to each of the three sliders 73. The rods 75 of each pair draw a parallelogram. In other words, the stage 78 must be on three parallel line segments drawn by the rods 75 of three pairs. For that reason, the stage 78 always is parallel to a certain plane. For that reason, the stage can move while maintaining the same posture (inclination) even if the sliders 73 move variously. For that reason, there is a merit that a movement is enabled while maintaining a directly-facing positional relationship of the illumination ray of the movable unit 57 and the imaging unit 3.

Tenth Embodiment

Figure 20:
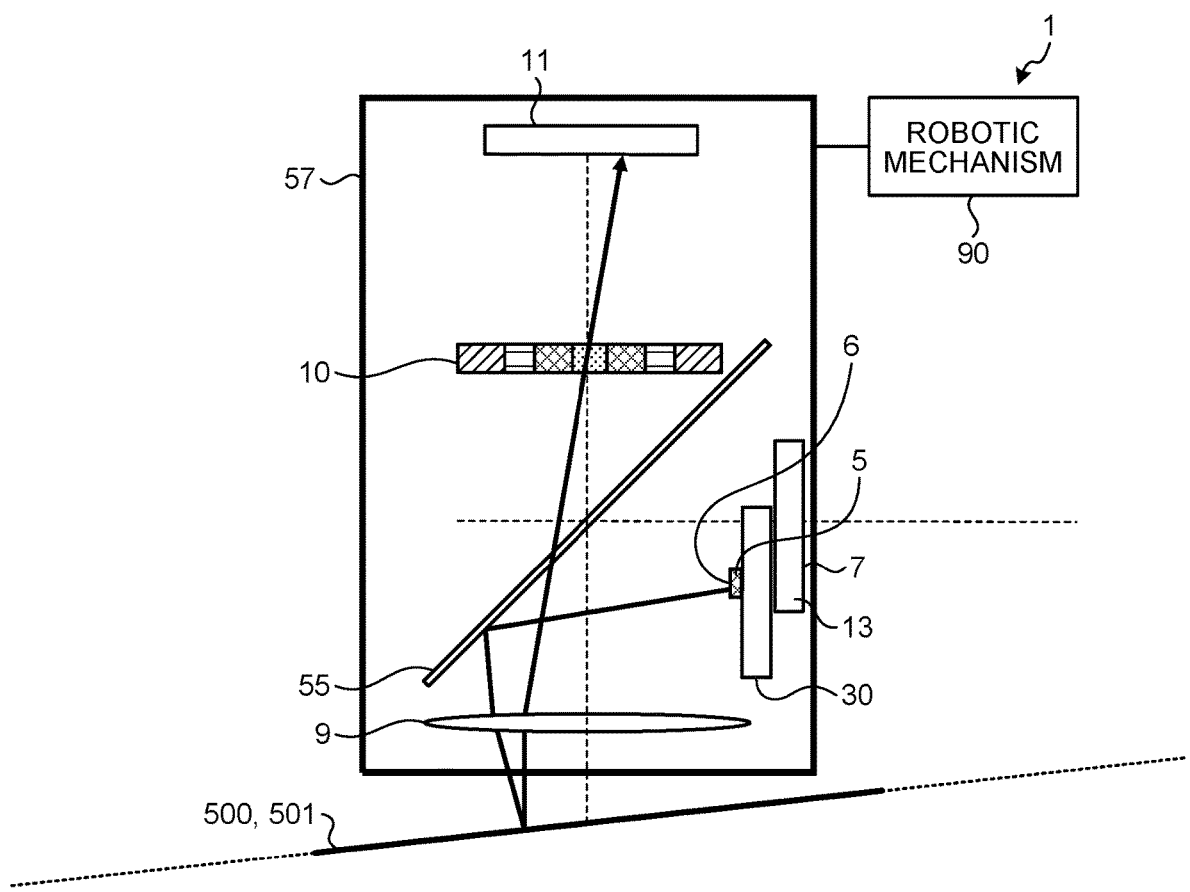
FIG. 20 is a diagram schematically illustrating an optical apparatus according to a tenth embodiment.

Hereinafter, the optical apparatus 1 according to the present embodiment will be described in detail with reference to FIG. 20. FIG. 20 is a diagram schematically illustrating the optical apparatus 1 according to the present embodiment.

The optical apparatus 1 according to the present embodiment includes the lighting unit 2, the imaging unit 3, and the control device 4. The configuration of the present embodiment is basically the same as the configuration of the seventh embodiment, and a difference between the seventh embodiment and the present embodiment will be mainly described herein.

The movable unit 57 according to the present embodiment includes the movable part 13, the sensor 11, and the imaging optical element 9. The movable unit 57 is attached to a robotic mechanism 90 for scanning. This results in enabling wide area scanning.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical apparatus comprising:
a lighting unit that emits illumination rays;
an imaging unit that includes a wavelength selecting unit including a plurality of wavelength selection regions through which the illumination rays reflected by a surface of an object or the illumination rays transmitted through the surface pass, and a sensor configured to receive the illumination rays passing through the wavelength selecting unit;
a processor; and
a positioning unit, wherein
the lighting unit includes:
a light emitting unit from which the illumination rays are emitted; and
an imaging optical element that makes the illumination rays emitted from the light emitting unit parallel,
the imaging unit includes a first imaging optical element through which the illumination rays reflected by the surface or the illumination rays transmitted through the surface pass,
the illumination rays passing through the first imaging optical element are incident on the wavelength selecting unit,
the positioning unit determines whether or not the illumination rays and an optical axis of the first imaging optical element are in a directly-facing relationship, by moving the light emitting unit,
in the directly-facing relationship,
when rays are incident along one of the illumination rays and the optical axis of the first imaging optical element and reflected by the surface, a dominant, specular component of reflected rays is in a specular direction along the other of the illumination rays and the optical axis of the first imaging optical element, and
when rays are incident along one of the illumination rays and the optical axis of the first imaging optical element and transmits the object, a dominant component of transmitting rays is along the other of the illumination rays and the optical axis of the first imaging optical element,
the plurality of wavelength selection regions includes a first wavelength selection region and a second wavelength selection region,
the first wavelength selection region converts a first ray passing through the first wavelength selection region among the illumination rays into a first selected ray whose dominant wavelength is a first wavelength,
the second wavelength selection region converts a second ray passing through the second wavelength selection region among the illumination rays into a second selected ray whose dominant wavelength is a second wavelength different from the first wavelength,
the sensor is able to acquire color phase information indicating color phases of the first selected ray and the second selected ray, and
the processor is configured to estimate a ray direction of the first ray and a ray direction of the second ray based on the color phase information and a relative position of the wavelength selecting unit in the imaging unit.

2. The optical apparatus according to claim 1, wherein the wavelength selecting unit is arranged on a focal plane of the first imaging optical element.

3. The optical apparatus according to claim 1, wherein the lighting unit includes:
a light emitting unit from which the illumination rays are emitted;
a second imaging optical element that makes the illumination rays emitted from the light emitting unit parallel; and
the positioning unit, and
the positioning unit is able to incline ray directions of the parallel rays with respect to an optical axis of the second imaging optical element.

4. The optical apparatus according to claim 1, wherein
the imaging unit includes the positioning unit, and
the positioning unit determines a position of the wavelength selecting unit.

5. The optical apparatus according to claim 1, wherein the processor is configured to acquire information on ray directions of scattered light scattered on the surface by using the color phase information.

6. The optical apparatus according to claim 1, wherein the wavelength selection regions are rotation symmetry.

7. The optical apparatus according to claim 1, wherein
the plurality of wavelength selection regions are lined up in a row, and
the sensor includes a line sensor.

8. The optical apparatus according to claim 1, further comprising:
a beam splitter that causes the ray directions of the illumination rays just before being reflected by the surface to be along a direction from the imaging unit toward a point where the illumination ray is reflected by the surface.

9. The optical apparatus according to claim 1, further comprising:
a beam splitter, wherein
the lighting unit includes a light emitting unit that is arranged on a focal plane of the first imaging optical element along a ray path broken by the beam splitter.

10. The optical apparatus according to claim 9, wherein
the positioning unit includes a movable unit that includes the light emitting unit and the wavelength selection regions, and
the movable unit is movable along the optical axis of the first imaging optical element in a state where a relative position between the light emitting unit and the wavelength selection regions is maintained.

11. The optical apparatus according to claim 10, wherein
the first imaging optical element includes a zoom lens, and
the movable unit moves along the optical axis in accordance with a movement of a focal plane of the zoom lens accompanied with a change in a zooming magnification of the zoom lens.

12. The optical apparatus according to claim 10, wherein the positioning unit includes:
a parallel link mechanism that includes a plurality of robot arms connected to the movable unit and moves the movable unit;
a driving unit that drives the parallel link mechanism; and
the control device that controls the driving unit, and the movable unit includes the sensor.

* * * * *